(12) United States Patent
Hu et al.

(10) Patent No.: US 11,036,068 B2
(45) Date of Patent: Jun. 15, 2021

(54) NON-VOLATILE THERMOTROPIC OPTICAL SWITCHES BASED ON IONIC LIQUID(S) AND POLYMER BLENDS

(71) Applicant: NANYANG TECHNOLOGICAL UNIVERSITY, Singapore (SG)

(72) Inventors: Xiao Hu, Singapore (SG); Heng Yeong Lee, Singapore (SG); Yufeng Cai, Singapore (SG)

(73) Assignee: Nanyang Technological University, Singapore (SG)

( * ) Notice: Subject to any disclaimer, the term of this patent is extended or adjusted under 35 U.S.C. 154(b) by 230 days.

(21) Appl. No.: 16/347,039

(22) PCT Filed: Nov. 2, 2017

(86) PCT No.: PCT/SG2017/050555
§ 371 (c)(1),
(2) Date: May 2, 2019

(87) PCT Pub. No.: WO2018/084810
PCT Pub. Date: May 11, 2018

(65) Prior Publication Data
US 2019/0258093 A1    Aug. 22, 2019

(30) Foreign Application Priority Data
Nov. 2, 2016 (SG) .......................... 10201609148X

(51) Int. Cl.
*G02F 1/01* (2006.01)
*C09K 9/02* (2006.01)
*G02F 1/00* (2006.01)

(52) U.S. Cl.
CPC .............. *G02F 1/0147* (2013.01); *C09K 9/02* (2013.01); *G02F 1/009* (2013.01); *G02F 1/0009* (2013.01)

(58) Field of Classification Search
CPC ...... G02F 1/0147; G02F 1/0009; G02F 1/009; C09K 9/02
(Continued)

(56) References Cited

U.S. PATENT DOCUMENTS

| 4,307,942 A | 12/1981 | Chahroudi |
| 6,296,920 B1 | 10/2001 | Buehler et al. |
| 2009/0072194 A1* | 3/2009 | Yamahara ......... G02F 1/133632 |
| | | 252/299.01 |

FOREIGN PATENT DOCUMENTS

| DE | 4433090 A1 | 3/1996 |
| EP | 0985709 B1 | 11/2004 |
| KR | 1020160100066 A | 8/2016 |

OTHER PUBLICATIONS

Ahmad et al., "Surfactant-doped reverse-mode polymer-dispersed liquid crystal display with enhanced properties," *Liquid Crystals* 43(2): 162-167, 2016.
(Continued)

*Primary Examiner* — William Choi
(74) *Attorney, Agent, or Firm* — Seed IP Law Group LLP

(57) ABSTRACT

The present disclosure is related to a non-volatile thermotropic composite material comprising a first component comprising a non-aqueous and non-volatile proton donating material; a second component comprising a monomer, an oligomer or a polymer as a proton accepting material; a non-volatile polymeric matrix; and wherein the non-volatile polymeric matric, the first component and the second component are configured to maintain at least one property which is reversibly changeable based on thermal energy received by or given out from the non-volatile thermotropic composite material. Proton donating materials include ionic liquid, poly(ionic liquid) and deep eutectic salt. The proton accepting material comprises at least an ether, a phenyl ester, an amide and an acrylate functional group. Also disclosed is (Continued)

a method of making said composite material comprising providing the first and second components and a non-volatile polymeric matrix and curing the mixture to form the non-volatile thermotropic composite material. The non-volatile thermotropic composite material can be used in smart windows.

20 Claims, 11 Drawing Sheets

(58) Field of Classification Search
USPC .......................... 359/288; 252/582, 586, 588
See application file for complete search history.

(56) References Cited

OTHER PUBLICATIONS

Cai et al., "Towards temperature driven forward osmosis desalination using Semi-IPN hydrogels as reversible draw agents," *Water Research* 47: 3773-3781, 2013.
Cai et al., "Exploration of using thermally responsive polyionic liquid hydrogels as draw agents in forward osmosis," *RSC Adv.* 5: 97143-97150, 2015.
Canongia Lopes et al., "Molecular Force Field for Ionic Liquids Composed of Triflate or Bistriflylimide Anions," *J. Phys. Chem. B* 108: 16893-16898, 2004.
Canongia Lopes et al., "Modeling Ionic Liquids Using a Systematic All-Atom Force Field," *J. Phys. Chem. B* 108: 2038-2047, 2004.
Canongia Lopes et al., "Nonpolar, Polar, and Associating Solutes in Ionic Liquids," *J. Phys. Chem. B* 110: 16816-16818, 2006.
Cláudio et al., "A critical assessment of the mechanisms governing the formation of aqueous biphasic systems composed of protic ionic liquids and polyethylene glycol," *Phys. Chem. Chem.Phys.* 18: 30009-30019, 2016.
Cupelli et al., "Self-adjusting smart windows based on polymer-dispersed liquid crystals," *Solar Energy Materials & Solar Cells* 93: 2008-2012, 2009.
De Bastiani et al., "Thermochromic Perovskite Inks for Reversible Smart Window Applications," *Chem. Mater.* 29: 3367-3370, 2017.
Dong et al., "Hydrogen Bonds in Imidazolium Ionic Liquids," *J. Phys. Chem. A* 110: 9775-9782, 2006.
Dong et al., "Self-Storage: A Novel Family of Stimuli-Responsive Polymer Materials for Optical and Electrochemical Switching," *Macromol. Rapid Commun.* 35: 1943-1948, 2014.
Fan et al., "Forward-Osmosis Desalination with Poly(Ionic Liquid) Hydrogels as Smart Draw Agents," *Adv. Mater.* 28: 4156-4161, 2016.
Feng et al., "Gasochromic smart window: optical and thermal properties, energy simulation and feasibility analysis," *Solar Energy Materials & Solar Cells* 144: 316-323, 2016.
Fumino et al., "Strong, Localized, and Directional Hydrogen Bonds Fluidize Ionic Liquids," *Angew. Chem. Int. Ed.* 47: 8731-8734, 2008.
Fumino et al., "Probing molecular interaction in ionic liquids by low frequency spectroscopy: Coulomb energy, hydrogen bonding and dispersion forces," *Phys. Chem. Chem. Phys.* 16: 21903-21929, 2014.
Gao et al., "$VO_2$-Sb:$SnO_2$ composite thermochromic smart glass foil," *Energy Environ. Sci.* 5: 8234-8237, 2012.
Ge et al., "A Robust Smart Window: Reversibly Switching from High Transparency to Angle-Independent Structural Color Display," *Adv. Mater.* 27: 2489-2495, 2015.
Ge et al., "An Optical Actuator Based on Gold-Nanoparticle-Containing Temperature-Memory Semicrystalline Polymers," *Angew. Chem. Int. Ed.* 56: 6126-6130, 2017.
Georg et al., "Switchable Glazing with a Large Dynamic Range in Total Solar Energy Transittance (TSET)," *Solar Energy* 62(3): 215-228, 1998.

Gladen et al., "Selection of thermotropic materials for overheat protection of polymer absorbers," *Solar Energy* 104: 42-51, 2014.
Gong et al., "Copolymer solution-based 'smart window'," *Applied Physics Letters* 95: 251907, 2009 (4 pages).
Guo et al., "Discovery of an excellent IR absorbent with a broad working waveband: $CS_xWO_3$ nanorods," *Chem. Commun.* 47: 8853-8855, 2011.
Hezaveh et al., "Structure and dynamics of 1,2-dimethoxyethane and 1,2-dimethoxypropane in aqueous and non-aqueous solutions: A molecular dynamics study," *J. Chem. Phys.* 135: 164501, 2011 (12 pages).
Hezaveh et al., "Molecular dynamics simulation study of solvent effects on conformation and dynamics of polyethylene oxide and polypropylene oxide chains in water and in common organic solvents," *J. Chem. Phys.* 136: 124901, 2012 (13 pages).
Hoarfrost et al., "Lower Critical Solution Temperature Phase Behavior of Poly(n-butyl methacrylate) in Ionic Liquid Mixtures," *Macromolecules* 46: 9464-9472, 2013.
Horowitz et al., "Poly(dimethylsiloxane)-Supported Ionogels with a High Ionic Liquid Loading," *Angew. Chem. Int. Ed.* 53: 9780-9783, 2014.
Howard et al., "How Good is Fluorine as a Hydrogen Bond Acceptor?" *Tetrahedron* 52(38): 12613-12622, 1996.
Hsu et al., "Radiative human body cooling by nanoporous polyethylene textile," *Science* 353(6303): 1019-1023, 2016.
Humphrey et al., "VMD: Visual Molecular Dynamics," *Journal of Molecular Graphics* 14: 33-38, 1996.
Kaminski et al., "Evaluation and Reparametrization of the OPLS-AA Force Field for Proteins via Comparison with Accurate Quantum Chemical Calculations on Peptides," *J. Phys. Chem. B* 105: 6474-6487, 2001.
Kato, "Self-Assembly of Phase-Segregated Liquid Crystal Structures," *Science* 295: 2414-2418, 2002.
Khandelwal et al., "Infrared Regulating Smart Window Based on Organic Materials," *Adv. Energy Mater.* 7: 1602209, 2017 (18 pages).
Kim et al., "Energy Efficient Glazing for Adaptive Solar Control Fabricated with Photothermotropic Hydrogels Containing Graphene Oxide," *Scientific Reports* 5: 7646, 2015 (6 pages).
Kim et al., "Nanocomposite Architecture for Rapid, Spectrally-Selective Electrochromic Modulation of Solar Transmittance," *Nano Lett.* 15: 5574-5579, 2015.
Kodama et al., "Lower Critical Solution Temperature Phase Behavior of Linear Polymers in Imidazolium-Based Ionic Liquids: Effects of Structural Modifications," *Langmuir* 25: 3820-3824, 2009.
Kodama et al., "Structural effects of polyethers and ionic liquids in their binary mixtures on lower critical solution temperature liquid-liquid phase separation," *Polymer Journal* 43: 242-248, 2011.
Kuang et al., "Organic Dye-Sensitized Enhancement in Performance through Ionic Liquid Based Solar Cells: Remarkable Molecular Design of Indoline Sensitizers," *Angew. Chem. Int. Ed.* 47: 1923-1927, 2008.
Kunzelman et al., "Oligo(p-phenylene vinylene)s as a 'New' Class of Piezochromic Fluorophores," *Adv. Mater.* 20: 119-122, 2008.
Le Bideau et al., "Ionogels, ionic liquid based hybrid materials," *Chem. Soc. Rev* 40: 907-925, 2011.
Lee et al., "Stepwise Activation of Switchable Glazing by Compositional Gradient of Copolymers," *ACS Appl. Mater. Interfaces* 8: 26359-26364, 2016.
Lee et al., "A Dual-Responsive Nanocomposite toward Climate-Adaptable Solar Modulation for Energy-Saving Smart Windows," *ACS Appl. Mater. Interfaces* 9: 6054-6063, 2017.
Lee et al., "Thermochromic Ionogel: A New Class of Stimuli Responsive Materials with Super Cyclic Stability for Solar Modulation," *Chem. Mater.* 29: 6947-6955, 2017.
Lei et al., "Effects of component molecular weight on the viscoelastic properties of thermoreversible supramolecular ion gels via hydrogen bonding," *Soft Matter* 8: 2110-2120, 2012.
Li et al., "A hierarchically porous anatase $TiO_2$ coated-$WO_3$ 2D IO bilayer film and its photochromic properties," *Chem. Commun.* 52: 892-895, 2016.

(56) References Cited

OTHER PUBLICATIONS

Liu et al., "Surface Acoustic Wave Driven Light Shutters Using Polymer-Dispersed Liquid Crystals," *Adv. Mater.* 23: 1656-1659, 2011.
Liu et al., "Thermochromic Infrared Metamaterials," *Adv. Mater.* 28: 871-875, 2016.
Lodge et al., "Mechanically Tunable, Readily Processable Ion Gels by Self-Assembly of Block Copolymers in Ionic Liquids," *Acc. Chem. Res.* 49: 2107-2114, 2016.
Manthiram et al., "Tunable Localized Surface Plasmon Resonances in Tungsten Oxide Nanocrystals," *J. Am. Chem. Soc.* 134: 3995-3998, 2012.
Martínez et al., "PACKMOL: A Package for Building Initial Configurations for Molecular Dynamics Simulations," *J. Comput. Chem.* 30: 2157-2164, 2009.
Mitov, "Cholesteric Liquid Crystals with a Broad Light Reflection Band," *Adv. Mater.* 24: 6260-6276, 2012.
Muehling et al., "Variable solar control using thermotropic core/shell particles," *Solar Energy Materials & Solar Cells* 93: 1510-1517, 2009.
Murray et al., "Electrically Controllable Light Trapping for Self-Powered Switchable Solar Windows," *ACS Photonics* 4: 1-7, 2017.
Néouze et al., "Ionogels, New Materials Arising from the Confinement of Ionic Liquids within Silica-Derived Networks," *Chem. Mater.* 18: 3931-3936, 2006.
Nitz et al., "Solar control with thermotropic layers," *Solar Energy* 79: 573-582, 2005.
Patil et al., "Efficient electrochromic smart windows of one-dimensional pure brookite $TiO_2$ nanoneedles," *Solar Energy Materials & Solar Cells* 147: 240-245, 2016.
Pei et al., "Factors Affecting Ionic Liquids Based Removal of Anionic Dyes from Water," *Environ. Sci. Technol.* 41: 5090-5095, 2007.
Plimpton, "Fast Parallel Algorithms for Short-Range Molecular Dynamics," *Journal of Computational Physics* 117: 1-19, 1995.
Resch et al., "Spectroscopic Investigations of Phase-Separated Thermotropic Layers Based on UV Cured Acrylate Resins," *Macromol. Symp.* 265: 49-60, 2008.
Resch et al., "Thermotropic layers for flat-plate collectors—A review of various concepts for overheating protection with polymeric materials," *Solar Energy Materials & Solar Cells* 93: 119-128, 2009.
Rotzetter et al., "Thermoresponsive Polymer Induced Sweating Surfaces as an Efficient Way to Passively Cool Buildings," *Adv. Mater.* 24: 5352-5356, 2012.
Rubenstein, "Polymers Physics," Oxford University Press, Oxford, United Kingdom, 2003 (58 pages).
Seeboth et al., "Thermotropic and Thermochromic Polymer Based Materials for Adaptive Solar Control," *Materials* 3: 5143-5168, 2010.
Seeboth et al., *Thermochromic and Thermotropic Materials*, Pan Stanford Publishing Pte. Ltd., 2013, Chapter 3, "Thermochromic and Thermotropic Materials Based on Light Scattering" (34 pages).
Seeboth et al., "Thermochromic Polymers—Function by Design," *Chem. Rev.* 114: 3037-3068, 2014.
Seo et al., "Ionic thermo-responsive copolymer with multi LCST values: easy and fast LCST-change through anion exchange," *Polym. Adv. Technol.* 27: 486-493, 2016.
Shi et al., "Energy gels: A bio-inspired material platform for advanced energy applications," *Nano Today* 11: 738-762, 2016.
Singh et al., "Ionic liquids confined in porous matrices: Physicochemical properties and applications," *Progress in Materials Science* 64: 73-120, 2014.
Smith et al., "Quantum Chemistry Based Force Field for Simulations of Poly(propylene oxide) and Its Oligomers," *J. Phys. Chem. A* 102: 10318-10323, 1998.
Steiner et al., "Geometric Analysis of Non-Ionic O—H ⋯ Hydrogen Bonds and Non-Bonding Arrangements in Neutron Diffraction Studies of Carbohydrates," *Acta Cryst.* B48: 819-827, 1992.
Steiner et al., Geometry of C—H ⋯ Hydrogen Bonds in Carbohydrate Crystal Structures. Analysis of Neutron Diffraction Data, *J. Am. Chem. Soc.* 114: 10146-10154, 1992.
Suzuki et al., "Preparation of free-standing thermosensitive composite gel particles incorporating ionic liquids," *Soft Matter* 9: 1761-1765, 2013.
Ueki et al., "Lower Critical Solution Temperature Behavior of Linear Polymers in Ionic Liquids and the Corresponding vol. Phase Transition of Polymer Gels," *Langmuir* 23: 988-990, 2007.
Ueki et al., "Difference in Lower Critical Solution Temperature Behavior between Random Copolymers and a Homopolymer Having Solvatophilic and Solvatophobic Structures in an Ionic Liquid," *J. Phys. Chem. B* 111: 4750-4754, 2007.
Wade et al., "Facile Deposition of Multicolored Electrochromic Metal-Organic Framework Thin Films," *Angew. Chem. Int. Ed.* 52: 13377-13381, 2013.
Wang et al., "Integrated energy storage and electrochromic function in one flexible device: an energy storage smart window," *Energy Environ. Sci.* 5: 8384-8389, 2012.
Wang et al., "Binary Solvent Colloids of Thermosensitive Poly(N-isopropylacrylamide) Microgel for Smart Windows," *Ind. Eng. Chem. Res.* 53: 18462-18472, 2014.
Watanabe, "Intelligent windows using new thermotropic layers with long-term stability," *SPIE's 1995 International Symposium on Optical Science, Engineering, and Instrumentation*, 1995, San Diego, California, United States (10 pages).
Watanabe, "Intelligent window using a hydrogel layer for energy efficiency," *Solar Energy Materials and Solar Cells* 54: 203-211, 1998.
Weber et al., "Thermotropic glazings for overheating protection," *Energy Procedia* 30: 471-477, 2012.
Weber et al., "Thermotropic Glazings for Overheating Protection. II. Morphology and Structure-Property Relationships," *J. Appl. Polym. Sci.* 39910, 2014 (13 pages).
Weber et al., "Thermotropic Glazings for Overheating Protection. I. Material Preselection, Formulation, and Light-Shielding Efficiency," *J. Appl. Polym. Sci.* 39950, 2014 (13 pages).
Weber et al., "Thermotropic overheating protection glazings: effect of functional additives and processing conditions on the overheating protection performance," *J. Polym. Eng.* 34(2): 161-172, 2014.
Wei et al., "Solar-thermochromism of Pseudocrystalline Nanodroplets of Ionic Liquid-$Ni^{II}$ Complexes Immobilized inside Translucent Microporous PVDF Films," *Adv. Mater.* 21: 776-780, 2009.
Weiss et al., "Encapsulation of ionic liquid $BMIm[PF_6]$ within polyuria microspheres," *Reactive and Functional Polymers* 96: 32-38, 2015.
Wilson, "Potential of thermotropic layers to prevent overheating: a review," *Optical Materials Technology for Energy Efficiency and Solar Energy Conversion XIII*, 1994, Freiburg, Germany (13 pages).
Wishart, "Energy applications of ionic liquids," *Energy Environ. Sci* 2: 956-961, 2009.
Wulf et al., "Spectroscopic Evidence for an Enhanced Anion-Cation Interaction from Hydrogen Bonding in Pure Imidazolium Ionic for Liquids," *Angew. Chem. Int. Ed.* 49: 449-453, 2010.
Yamaguchi et al., "Hybrid aligned nematic liquid crystal smart glass with asymmetrical daylight controls," *Journal of the SID* 23(8): 365-370, 2015.
Yang et al., "Temperature-responsive hydroxypropylcellulose based thermochromic material and its smart window application," *RSC Adv.* 6: 61449-61453, 2016.
Yuan et al., "Thermotropic Color Changing Nanoparticles Prepared by Encapsulating Blue Polystyrene Particles with a Poly-N-Isopropylacrylamide Gel," *Journal of Applied Polymer Science* 105: 446-452, 2007.
Zhai et al., "Scalable-manufactured randomized glass-polymer hybrid metamaterial for daytime radiative cooling," *Science* 355: 1062-1066, 2017.
Zhang et al., "Solution-based fabrication of vanadium dioxide on F: $SnO_2$ substrates with largely enhanced thermochromism and low-emissivity for energy-saving applications," Energy Environ. Sci. 4: 4290-4297, 2011.

(56) References Cited

OTHER PUBLICATIONS

Zhou et al., "High-Temperature Gating of Solid-State Nanopores with Thermo-Responsive Macromolecular Nanoactuators in Ionic Liquids," *Adv. Mater.* 24: 962-967, 2012.

Zhou et al., "$VO_2$ thermochromic smart window for energy savings and generation," *Scientific Reports* 3: 3029, 2013 (5 pages).

Zhou et al., "Temperature-responsive hydrogel with ultra-large solar modulation and high luminous transmission for "smart window" applications," *J. Mater. Chem. A* 2: 13550-13555, 2014.

Zhou et al., "$VO_2$/hydrogel hybrid nanothermochromic material with ultra-high solar modulation and luminous transmission," *J. Mater. Chem. A* 3: 1121-1126, 2015.

Zhou et al., "Electro-Thermochromic Devices Composed of Self-Assembled Transparent Electrodes and Hydrogels," *Adv. Mater. Technol.* 1: 1600069, 2016 (7 pages).

\* cited by examiner

Proton Donor (A)

Ionic liquid

R, R', $R_1$ to $R_5$ can be alkyl groups, hydrogen atoms, aryl groups or vinyl groups

FIG. 3B

Proton Acceptor (B)

Examples of Phenyl Esters

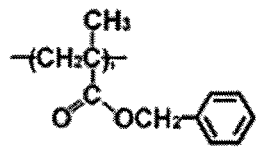

Benzyl Methacrylate

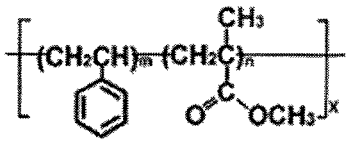

Poly (styrene-co-methylmethacrylate)

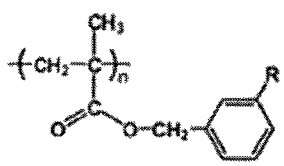

Poly (benzyl methacrylate) derivative (phenyl)

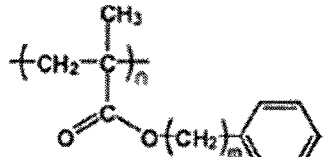

Poly (benzyl methacrylate) derivative (ester)

Examples of Ethers

Butyl methyl ether

tert-butyl methyl ether

cyclopentyl methyl ether

cyclohexyl methyl ether

sec-butyl methyl ether

tert-amyl methyl ether

tert-butyl ethyl ether

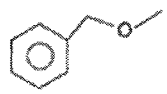

benzyl methyl ether

Examples of Amide        Examples of Acrylate

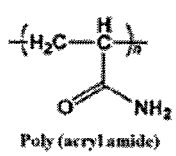

Poly (acryl amide)

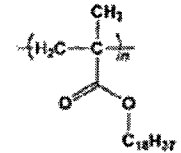

Poly (octadecyl methacrylate)

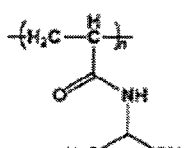

Poly (N-isopropyl acrylamide)

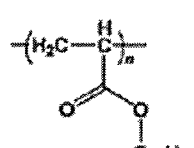

Poly (octadecyl acrylate)

n, m and x are repeating units while R can be any form of structural modifications such as H, $NO_2$, Cl, $CH_3$, $OCH_3$, F etc.

FIG. 3C

Matrix Polymer (C)

- Poly esters (e.g. PC, PET, etc.)
- Poly olefins (e.g. PP,PE,COC, etc.)
- Poly ethers / ethers containing polymers (e.g. PEO, PPO, PVB etc.)
- Poly urethane (e.g. PU, etc.)
- Poly acrylate (e.g. PMMA, etc.)
- Ionomer (e.g. Surlyn®, etc.)
- Thermoplastic Elastomer (e.g. TPS,TPO, TPU, TPV, etc.)
- Epoxy, etc.
- Silicone, etc.

Polymers above can be in the form of homo or copolymer in either linear, branched, star shaped, crosslinked or other configuration

FIG. 4

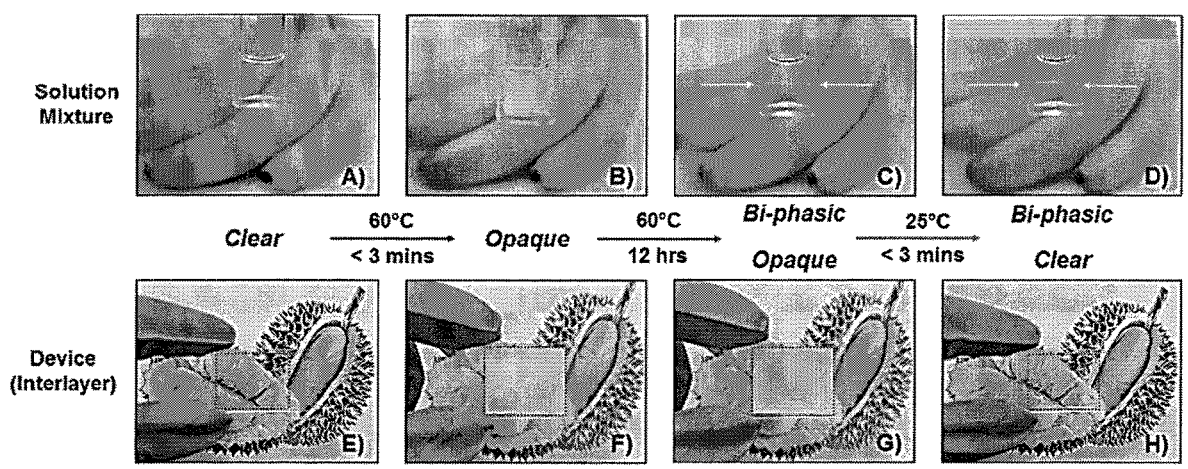

Clear State ⟷ Opaque State even though it is previously biphasic. PPO represents polypropylene oxide.

NON-VOLATILE THERMOTROPIC OPTICAL SWITCHES BASED ON IONIC LIQUID(S) AND POLYMER BLENDS

CROSS-REFERENCE TO RELATED APPLICATION

This application claims the benefit of priority of Singapore Patent Application No. 10201609148X, filed 2 Nov. 2016, the content of it being hereby incorporated by reference in its entirety for all purposes.

TECHNICAL FIELD

The present disclosure relates to non-volatile thermotropic composite materials. The present disclosure also relates to a method of making the non-volatile thermotropic composite materials.

BACKGROUND

Due to imposing threat of global warming, it has been reported that 43% of the world primary energy may have been spent on heating, ventilation and air-conditioning (HVAC). One solution to reduce this energy consumption may be to utilize windows that can selectively retain or block out near infrared light (NIR). Conventional low emissivity (low-e) coating of silver tends to result in relatively low transmittance for visible light, and silver oxidizes too easily.

In another solution, although multilayer optical films that aim to stabilize the temperature of a highly glazed room have been implemented, many of them are either steady state and unresponsive to surrounding ambient temperature changes or require extra energy inputs for dynamic control. This results in an opportunity to provide passive and dynamic control of solar heat gain, with a substantial reduction of heat and dimming of glaring sunlight.

For solutions with focus on energy conservation, immense efforts have been channeled into development of smart windows with different modes of activation, such as photochromic, gasochromic, electrochromic, thermochromic and those based on thermotropic hydrogel.

Thermotropic hydrogels working on the basis of phase separation exhibited the best performance in terms of optical switching characteristic. For example, rapid switching (<10 K), low hysteresis as well as high solar transmittance (>82%) and high opacity (<5%) in the clear and scattered state, respectively, have been reported. However, the fact that water and organic solvents reside within the system, limits the applicability of thermotropic hydrogel smart window. The limitations include restricted operation temperature (0° C. to 40° C.), high demands on sealing efficiency, volume reduction of chemically crosslinked gels etc.

Other conventional thermotropic materials that have been explored tend to suffer from the drawbacks of volume reduction, water evaporation, poor optical switching characteristic, and consequently, non-stable performance over time.

There is thus a need to provide for a non-volatile thermotropic composite material that resolves and/or ameliorates the issues mentioned above. The non-volatile thermotropic composite material provided should at least be capable of modulating the transmission of light having various wavelengths under external temperature stimulus. When applied in smart windows, the non-volatile thermotropic composite material should enable the smart windows to switch between being transparent to opaque and vice versa (modulation of solar irradiation) at different temperatures.

There is also a need to provide for a method to make such a non-volatile thermotropic composite material.

SUMMARY

In one aspect, there is provided for a non-volatile thermotropic composite material comprising:
a first component comprising a non-aqueous and non-volatile proton donating material;
a second component comprising a monomer, an oligomer or a polymer as a proton accepting material;
a non-volatile polymeric matrix; and
wherein the non-volatile polymeric matrix, the first component and the second component are configured to maintain at least one property which is reversibly changeable based on thermal energy received by or given out from the non-volatile thermotropic composite material.

In another aspect, there is a provided for a method of making a non-volatile thermotropic composite material as disclosed above, comprising:
providing a mixture comprising a first component, a second component and a non-volatile polymeric matrix, wherein the first component comprises a non-aqueous and non-volatile proton donating material, wherein the second component comprises a monomer, an oligomer or a polymer as a proton accepting material; and
curing the mixture to form the non-volatile thermotropic composite material.

BRIEF DESCRIPTION OF THE DRAWINGS

The drawings are not necessarily to scale, emphasis instead generally being placed upon illustrating the principles of the invention. In the following description, various embodiments of the present disclosure are described with reference to the following drawings, in which:

FIG. 3B shows a list of examples of a non-volatile key component, specifically proton acceptor (B) which includes, but is not limited to, molecules containing moieties of ether, phenyl esters, amide, and/or acrylate functional groups.

FIG. 3C shows a list of examples of a non-volatile key component, specifically matrix polymer (i.e. polymeric matrix) of different classification.

FIG. 4A shows a clear solution mixture of IL-PPO at the start before heating. PPO represents polypropylene oxide.

FIG. 4B shows that the IL-PPO solution mixture turned opaque after heating at 60° C. for 3 minutes or less. Biphasic separation is not yet observable.

FIG. 4C demonstrates the irreversible biphasic separation of IL-PPO solution mixture after subjecting to water bath for 12 hours at 60° C. Specifically, FIG. 4C shows that the IL-PPO solution mixture reverts to a clear solution mixture but the biphasic separation remains, where the phase boundary is depicted by the arrows.

FIG. 4D is used to demonstrate the irreversible biphasic separation of IL-PPO solution mixture after subjecting to water bath for 12 hours at 60° C. Specifically, FIG. 4D shows that the IL-PPO solution remained in its biphasic separated state (where the phase boundary is depicted by the arrows) after cooling for 3 minutes or less in a water bath at 25° C.

FIG. 4E is used to demonstrate the optical transition reversibility of IL-PU thermotropic device after placement on a heating stage for 12 hours at 60° C. PU represents polyurethane. The IL-PU is in the form of an interlayer in the device. Specifically, FIG. 4E shows a clear interlayer of IL-PU at the start before heating.

FIG. 4F is used to demonstrate the optical transition reversibility of IL-PU thermotropic device after placement on a heating stage for 12 hours at 60° C. The IL-PU is in the form of an interlayer in the device. Specifically, FIG. 4F shows that the interlayer turned opaque after heating at 60° C. for 3 minutes or less.

FIG. 4G is used to demonstrate the optical transition reversibility of IL-PU thermotropic device after placement on a heating stage for 12 hours at 60° C. The IL-PU is in the form of an interlayer in the device. Specifically, FIG. 4G shows that the interlayer remained opaque after 12 hours.

FIG. 4H is used to demonstrate the optical transition reversibility of IL-PU thermotropic device after placement on a heating stage for 12 hours at 60° C. The IL-PU is in the form of an interlayer in the device. Specifically, FIG. 4H shows that the interlayer reverted to a clear state after cooling for 3 minutes or less in a water bath at 25° C.

FIG. 7A also shows the effect of binary IL ratios. IL(A) refers to [$C_4$mim][$NTf_2$] while IL(B) refers to [$C_4$dmim][$NTf_2$].

FIG. 8A shows the solution mixture was opaque at room temperature of 25° C. before heating.

FIG. 8B shows the solution mixture remained opaque after heating at 45° C.

FIG. 8C shows that the solution mixture was clear at room temperature of 25° C. before heating. Solvatophilic properties of PVB-Butanol were exploited in order to gain miscibility of IL-PPO mixture at room temperature.

FIG. 8D shows the solution mixture of FIG. 8C turned immiscibly opaque after heating at 45° C.

FIG. 13B demonstrates that the ionogel can be triggered by solar irradiation. The insets depict the photos of neat ionogel and composite ionogel before and after irradiation taken by infrared camera. The transition temperature of the composite ionogel is about 33° C.

DETAILED DESCRIPTION

Figure 1:
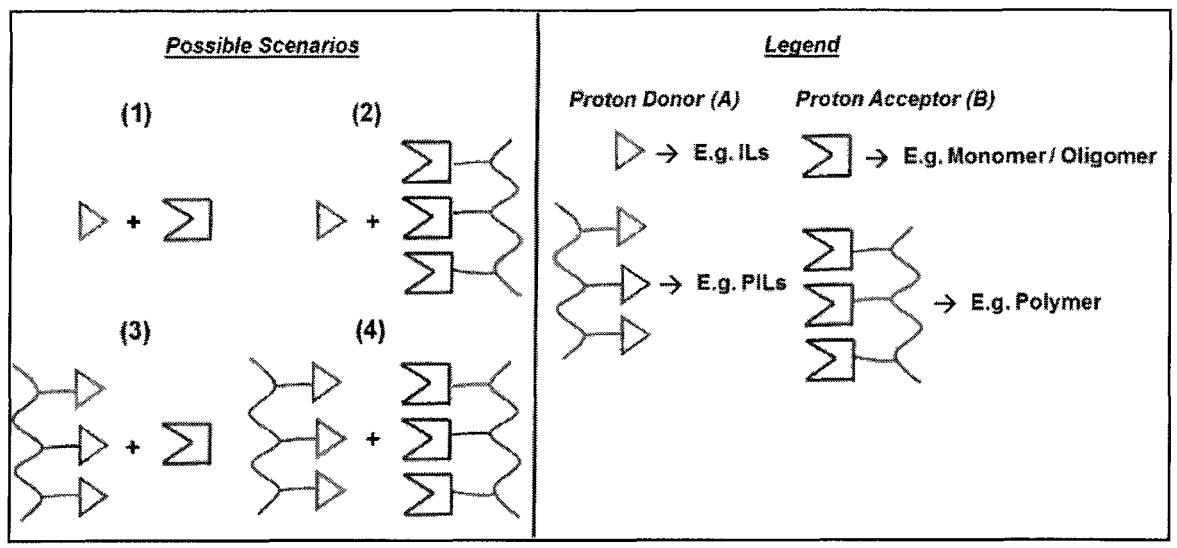
FIG. 1 shows examples of different combinations based on different proton donors (A) and proton acceptors (B) that lead to reversible optical switching behaviour. Other molecular architectures not illustrated in FIG. 1 are possible.

The following detailed description refers to the accompanying drawings that show, by way of illustration, specific details and embodiments in which the invention may be practised.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The present disclosure relates to thermotropic materials and a method of making thermotropic materials. Thermotropic materials of various embodiments of the present disclosure may refer to non-volatile thermotropic materials. Thermotropic materials are incredibly attractive for shielding against solar energy. Due to such a property, thermotropic materials have been conventionally applied in smart windows. In smart windows, it is highly desirable that both the transmittance of the visible (VIS) and near infrared (NIR) spectra can be modulated autonomously by such conventional thermotropic materials in order to control the solar luminance intensity and thermal comfort of the interior architecture. Such conventional thermotropic smart windows may be categorised by their switching mechanism, which includes aggregation, changes in particle size, phase transition of the constituents etc.

Conventional thermotropic materials used in smart windows to enable reversible transparency-translucency switching may include thermally responsive polymer hydrogels, blends, nanoparticles, phase change materials etc. These materials, however, suffer from the drawbacks of volume reduction, water evaporation, poor optical switching characteristic, and consequently, non-stable performance over time.

As mentioned above, conventional thermotropic hydrogel tends to have a limited temperature range in which it remains operable, have high demands on sealing efficiency and is susceptible to volume reduction.

On the contrary, thermotropic materials with fixed domains (TSFD) that work based on phase transition appear to be more reliable compared to thermotropic hydrogels. Through exploitation of phase change materials such as waxy polymer and n-alkanes as thermotropic additives, challenges faced in the case of hydrogels may be circumvented by using TSFD. However, poor optical properties such as low solar transmittance (<70%) in the clear state due to refractive index (RI) mismatch, moderate switching ranges of about 25% and high switching hysteresis tend to occur for TSFD.

An improved version of TSFD may be derived by modifying the thermotropic component to have a n-alkane@PMMA structure along with the inclusion of n-docosanol. Such modification in terms of the material's design and composition resulted in a better backscattering efficiency as well as lower switching hysteresis. Unfortunately, radical oil-water mini-emulsion polymerization needs to be adopted to achieve controlled and narrow particle size distribution so that the scattering domain lies in the range of 200 mm to 400 nm. Numerous trials of processing optimization and screening of materials may also have to be conducted to realize the best possible matching of RI between the core, shell and matrix, such that the solar transmittance in the clear state is not compromised for TSFD. Furthermore, the switching range for TSFD tends to be much lower (approximately 50%) as compared to that of thermotropic hydrogels.

To ameliorate on the issues mentioned above, the present disclosure provides an improved thermotropic composite material distinguished from conventional thermotropic materials such as thermotropic hydrogels or TSFD. The present disclosure also provides a method of making such an improved thermotropic composite material. The present thermotropic composite material operates based on a lower critical solution temperature (LCST) phase separation mechanism while fulfilling the various requirements of smart window application.

The present thermotropic composite material may be derived from a polymeric matrix (such as blends, copolymers etc.) and non-volatile component(s) (e.g. proton donating and/or proton accepting materials). The tunable and reversible interactions between the proton donating and proton accepting materials may impart thermo-sensitivity. As non-volatile components may be used in forming the present thermotropic composite material, the present thermotropic composite material may be advantageously non-volatile.

Basically, in the case of transparent to translucent switching, the present homogeneous thermotropic composite material advantageously undergo reversible micro-phase separation with temperature change. The temperature change may be an increase or decrease in temperature. As a result, the reflective-index disparity of the newly-generated phases may partially or entirely block solar illumination, and render the present thermotropic materials translucent. The temperature change may be due to thermal energy received by the present thermotropic composite material or given out from the present thermotropic composite material. For instance, the present thermotropic composite material may be directly heated to cause an optical state change. In instances where change in optical state is needed but such direct heating (i.e. thermal energy) is not available, the present thermotropic composite material can be advantageously incorporated with an additive that converts other sources of energy (e.g. light energy, electrical energy) to the thermal form. For example, an additive that converts electromagnetic waves irradiated onto the present thermotropic composite material into thermal energy can be incorporated. The converted thermal energy then causes a change in the optical state. To revert to its original optical state, the present thermotropic composite material may be cooled by any means. Based on these instances, the present thermotropic composite material is advantageously versatile in that the at least one property may be reversibly changed based on direct or indirect heating of the present thermotropic composite material.

In other embodiments, the at least one property may be reversibly changed based on direct cooling or indirect cooling of the present thermotropic composite material. For example, the present thermotropic composite material may change from a transparent to an opaque state when cooled, and revert back to its transparent state when heated.

The stable and functional proton donating material(s) may comprise ionic liquids, deep eutectic salts/solvents, including polymers and/or oligomers of such ionic liquids and deep eutectic salts/solvents. A non-limiting example of a polymer of an ionic liquid can be a poly(ionic liquid). Such proton donating material(s) may be non-volatile so that the present composite material can work reliably and durably at any temperature from −50° C. to 120° C., or even wider. The expressions "deep eutectic salts" and "deep eutectic solvents" are used interchangeably in the present disclosure.

Another prominent advantage of the present composite material lies in the use in a wide variety of polymers, in which the processing methods of such polymers may be known to the skilled person. Such polymers may include but are not limited to, polyurethanes (PU), poly(methyl methacrylate) (PMMA) and silicones. The polymer incorporation methods include in-situ (co)polymerization, grafting, solution casting, infusion, physical blending etc., and the final product can be formed as a free-standing film, a thin layer coating etc. Regardless of its form, the present thermotropic composite material advantageously possesses negligible or even zero volume change during optical transition.

The optical transition temperature of the present thermotropic composite material is also advantageously tunable to cater for different applications, by modifying molecular structure, adjustment of compositions, types of non-volatile additives, inclusion of other additives/particles etc. Optical transition temperature, in the context of the present disclosure, is defined as the temperature with a transmittance drop of 20% from the highest value at a wavelength of 550 nm.

Due to the various advantages described above, the present thermotropic composite material can be used in a wide range of autonomously responsive systems for many applications, for instance, smart window application where the present thermotropic composite materials may be tuned such that they have transition temperatures higher than room temperatures. The room temperatures may be, for example, 15° C. to 30° C.

The present thermotropic composite material may be referred to herein as an iongel or ionogel. Iongel or ionogel, namely gel that contains one or more ionic liquids (ILs) (or even poly(ionic liquid), deep eutectic salt), may be soft semi-solid matters with the three-dimensional (3D) network percolating throughout the IL and retaining the IL's various properties. Such iongel differs from hydrogel, or even organogel, in terms of their exceptional stability even at high temperatures due to the IL's negligible vapour pressure and in terms of their intrinsic thermal stability. While the IL(s) provide these intrinsic functionalities, the 3D network of the polymeric matrix provides mechanical integrity to the ILs.

Advantageously, the choice of IL, poly(ionic liquid) or deep eutectic salt as a non-volatile component renders the present thermotropic composite material a better candidate over current existing materials used for thermotropic smart window. Requirements such as non-freezing, excellent weatherability, innocuous, free of organic solvents, shrinkage-free and many other properties are also simultaneously fulfilled.

Having outlined various advantages of the present thermotropic composite material and its uses, definitions of certain terms are first discussed before going into details of various embodiments.

The term "non-aqueous", as used herein, means that water is entirely absent from a material. For example, a non-aqueous proton donating material means it does not contain water.

The term "non-volatile", in the context of the present disclosure, refers to a substance that does not readily evaporate or turn into a gas. For example, non-volatile materials used in the present disclosure, such as the proton donating material and the polymeric matrix, do not evaporate or turn into gas unless their temperature reaches their boiling point (e.g. more than 150° C.).

The word "substantially" does not exclude "completely" e.g. a composition which is "substantially free" from Y may be completely free from Y. Where necessary, the word "substantially" may be omitted from the definition of the invention.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

As used herein, the phrase of the form of "at least one of A and B" may include A or B or both A and B. Correspondingly, the phrase of the form of "at least one of A and B and C", or including further listed items, may include any and all combinations of one or more of the associated listed items.

Unless specified otherwise, the terms "comprising" and "comprise", and grammatical variants thereof, are intended to represent "open" or "inclusive" language such that they include recited elements but also permit inclusion of additional, unrecited elements.

Having defined the various terms as mentioned above, various embodiments of the present thermotropic composite material and the method are now described below.

In the present disclosure, there is provided for a thermotropic composite material comprising: a first component comprising a non-aqueous and non-volatile proton donating material; a second component comprising a monomer, an oligomer or a polymer as a proton accepting material; a non-volatile polymeric matrix; and wherein the non-volatile polymeric matrix, the first component and the second component are configured to maintain at least one property which is reversibly changeable based on thermal energy received by or given out from the thermotropic composite material. In various embodiments, the present thermotropic composite material may be non-volatile. Advantageously, the present thermotropic composite material is able to maintain a reversible change of the at least one property based on the thermal energy received or given out, by relying on the first component, second component and polymeric matrix, without the need to incorporate further additives. Even if further additives are added, neither this advantage nor the performance of the present thermotropic composite material will be compromised. This reflects the adaptability of the present thermotropic composite material.

Reversibility of the at least one property of the present thermotropic composite material (i.e. ionogel) may be illustrated as follows. According to various embodiments, the ionogel may have its own characteristic transition temperature, i.e. the temperature that leads to a change of the at least one property. An example of such a transition temperature may be the optical transition temperature as defined above. In such a context, the transition temperature is related to a change in the optical state of the present thermotropic composite material. The ionogel may also provide for a reversible change in optical property (e.g from transparent to opaque) upon cooling. In the context of the present disclosure, the present thermotropic composite material may have a transition temperature that relates to other property. The ionogel may be homogeneous and transparent, before being subjected to thermal energy or a change in thermal energy, in some embodiments. For example, when the transparent ionogel is subjected to thermal energy (e.g. solar heat), its temperature rises. As its temperature increases above its transition temperature, isolated domains of the first component (e.g. IL) may emerge as a result of micro-phase separation from the second component and/or polymeric matrix, and the ionogel may become translucent or opaque as light scatters at interfaces of the isolated domains (e.g. IL domains) and the second component and/or polymeric matrix. Despite the micro-phase separation, the domains (e.g. IL domains) may be contained by a network of polymeric chains of the polymeric matrix. The network of polymeric chains may be crosslinked and/or aggregated to form walls that confine, either partially or entirely, the IL domains. This prevents the micro-phase separation from escalating into a macroscopic scale phase separation, where the latter renders the change in optical property or optical state of the ionogel irreversible.

In addition, the ionogel may have self-storage properties in that the micro-scale domains may serve as a reservoir for the first component, within the translucent or opaque ionogel. Since the first component may be confined within the second component and/or the polymeric matrix, which maintains the ionogel in its gel form, the ionogel can be used as a solid device without any IL additives or supplements to maintain such responsive properties. Hence, in various embodiments, the non-volatile second component and/or polymeric matrix may comprise or consist of a network of polymer chains which confine the first component.

Meanwhile, when the ionogel's temperature drop below its transition temperature, mutual affinity dominates the interactions between the first component and second component, and/or the polymeric matrix. The phase-separated IL domains of the first component, which remain (partially or entirely) within the polymeric matrix of the ionogel, diffuse back into the polymeric matrix network to cause the ionogel to revert to its original homogeneity and transparency. This diffusion process may be aided by (1) having a large contact area between the two phases (the IL domains and the polymeric matrix network), (2) low viscosity of the first component, and/or (3) the entropic elasticity of the second component or second component and polymeric matrix, which in turn enable the ionogel's optical switching to be achieved within a few seconds.

Based on the above, in various embodiments, subjecting the present thermotropic composite material to an increase in temperature may exert an effect on the interactions between the various components of the present thermotropic composite material. The effect may be molecular repulsion between the various components, leading to a well-defined phase separation to form IL-rich domains which cause light scattering and reduced optical transmittance. Conversely, decreasing temperature may enhance affinity of the various components, resulting in complete phase mixing and high optical transmittance. The optical transmittance of the ionogel may depend on the solvation conditions between the first and second components network.

The reversibility of the at least one property may also be affected by the first component and the second component as these components have an effect on LCST mechanism. Temperature-sensitive interactions such as hydrogen bonding may exist between the first component and the second component. In various embodiments, the second component may need to be capable of forming hydrogen bonds, i.e. a proton acceptor (proton accepting material) having one or more hydrogen bond acceptance sites. The hydrogen acceptance site(s) of the second component may be any moiety containing an atom capable of forming hydrogen bond (e.g. oxygen, nitrogen or sulphur). As the second component serves as the proton acceptor, the first component then acts as the proton donor (proton donating material). That is to say, the first component (e.g. IL), being the proton donor, may comprise cations that have one or more hydrogens capable of forming hydrogen bonds with the second component. In this regard, the expression "proton accepting material" or "proton acceptor" as defined above is used with respect to the second component while the expression "proton donating material or "proton donor" as defined above is used with respect to the first component. The anion of the proton donor of the first component may be equally important in that the anion forms a subtle attraction with cation of the first component to balance against the interaction between the first component and the second component.

Anions with stronger (or weaker) hydrogen bonding tendency, or other forms of interaction, may adversely disrupt (or adversely strengthen) hydrogen bonding between cation of the first component and hydrogen acceptance site(s) of the second component, thereby annihilating the LCST mechanism. Thus, the interactions between the first component and the second component affect the LCST mechanism, which in turn affects the thermal sensitivity and responsiveness of the present thermotropic composite material.

In some embodiments, the proton accepting material may be crosslinked to the non-volatile polymeric matrix by a crosslinking agent to form a part of the non-volatile polymeric matrix. The crosslinking agent may comprise or consist of an isocyanate. The isocyanate may comprise or consist of an aliphatic isocyanate. The isocyanate may include, without being limited to, methylenebis(phenyl isocyanate) (MDI), hexamethylene diisocyanate (HDI), toluene diisocyanate (TDI), or their trimers thereof. The isocyanate can also be an oligmer. A non-limiting example of a HDI isocyanate that can be used is Tolonate™ HDT-90. Other possible crosslinking agents may include ethylene glycol di(meth)acrylate, methylenebisacrylamide, divinylbenzene, and/or their derivatives. The type of crosslinking agent used may depend on the crosslinking chemistry needed. To illustrate these embodiments, a non-limiting example based on polypropylene oxide (PPO) as the proton accepting material and Tolonate™ HDT-90 as the crosslinking agent, is referred to. When PPO is contacted with Tolonate™ HDT-90, the PPO reacts with Tolonate™ HDT-90 and becomes crosslinked to form a part of the non-volatile polymeric matrix. By crosslinking the proton accepting material to the non-volatile polymeric matrix with the crosslinking agent, the proton accepting material may constitute part of the non-volatile polymeric matrix, even though a bulk portion of the proton accepting material may remain as a material distinct from the non-volatile polymeric matrix.

In various embodiments where a crosslinking agent is used, the molar ratio of the proton accepting material to the crosslinking agent may be, but is not limited to, 1:0.5 to 1:2.5. In embodiments where PPO (in the form of a diol or triol) and an isocyanate (NCO) are used, the PPO (diol or triol):NCO (isocyanate) molar ratio may be, but is not limited to, the range from 1:0.5 to 1:2.5, such as 1:0.6, 1:1.0, 1:1.2 or 1:2.0 etc.

In various embodiments, the proton donating material may be non-aqueous and non-volatile. In various embodiments, the first component or the proton donating material may comprise any value from 30 weight percent to 70 weight percent of the non-volatile thermotropic composite material. This may help to maintain the thermotropic composite material in its free-standing ionogel form (requiring no substrate to support the ionogel). Above 70 weight percent, a viscous solution of the present thermotropic composite may be formed while below 30 weight percent, the optical contrast may be low and switching of the optical state may become sluggish. The amount of proton donating material (e.g. IL) used may affect reversibility of the at least one property as well as other parameters, such as optical switching contrast, optical switching speed, the ability to form free-standing ionogel etc.

In various embodiments, the non-aqueous and non-volatile proton donating material may comprise at least one ionic liquid, poly(ionic liquid) (PIL) or deep eutectic salt. In some embodiments, the non-aqueous and non-volatile proton donating material may comprise or consist of binary ionic liquids. That is to say, the non-aqueous and non-volatile proton donating material may comprise or consist of two different ionic liquids. Each of the two different ionic liquids may have a value between 0 weight percent to 100 weight percent, wherein the weight percent is based on the two different ionic liquids. In some embodiments, the non-aqueous and non-volatile proton donating material may comprise more than two ionic liquids. An example is a ternary mixture of three ionic liquids such as $[C_2mim][Ntf_2]$, $[C_4mim][NTf_2]$ and $[C_4dmim][Ntf_2]$. Using a ternary mixture of ionic liquids may advantageously lower the overall cost of raw materials used.

The weight percent of each of the two different ionic liquids may be used to derived their weight percent ratio. For instance, the first ionic liquid may be 10 weight percent and the other ionic liquid may be 90 weight percent. This means that the weight percent ratio of the two different ionic liquids may be 10:90. Advantageously, the weight percent ratio between the two different ionic liquids may be used to adjust the transition temperature at which the present thermotropic composite material changes its at least one property e.g. its optical state. This is useful as the present thermotropic composite material may be developed for smart window application in different environments of hot and cold climate.

The IL, PIL and deep eutectic salt of the proton donating material (or the first component) may be formed of cations and anions. In various embodiments, the IL, PIL and deep eutectic salt may have an anion. In various embodiments, the IL, PIL and deep eutectic salt may have a cation. In some embodiments, the at least one ionic liquid may be composed of an anion and a cation optionally substituted with one or more alkyl chains having any number of carbon atom from 1 to 10, 1 to 8, 1 to 6, etc. This may also be the case for the at least one PIL. Any suitable number of carbon atoms may also be used as long as the IL or PIL is compatible with the other components and an appropriate level of hydrogen bonding between the cations and anions of the proton donating material is maintained. The hydrogen bonding may also be formed with the second component.

In some embodiments, the anion may be selected from the group consisting of acetate, benzenesulphonate, bistriflimide, dicyanamide, dihydrogenphosphate, formate, halides, hexafluorophosphate, hydroxide, lactate, nitrate, tetrachloroferrate, tetrafluoroborate, tricyanomethanide and triflate. In some embodiments, the anion may be $NTf_2$.

In some embodiments, the cation may be selected from the group consisting of ammonium, cholinium, imidazolium, isoquinolinium, oxazolium, phosphonium, piperidinium, pyrazinium, pyridinium, pyrimidinium, pyrrolidinium and sulphonium. The cation, including these listed cations, may be optionally substituted with one or more alkyl chains having any number of carbon atom from 1 to 10. In some embodiments, the cation may be $C_4mim$, $C_4dmim$, $C_2mim$ or $C_6mim$.

Consideration on the selection of anion and cation have been discussed above in that they should maintain balanced interactions between the first and second components, and also between the anion and cation themselves as the transition behaviour may be affected. Some ILs that may be formed include, but are not limited to, 1-butyl-3-methylimidazolium bis(trifluoromethylsulphonyl)imide ($[C_4mim][NTf_2]$), 1-butyl-2,3-dimethylimidazolium bis(trifluoromethylsulphonyl)imide ($[C_4dmim][NTf_2]$), 1-ethyl-3-methylimidazolium bis(trifluoromethylsulphonyl)imide ($[C_2mim][NTf_2]$), 1-hexyl-3-methylimidazolium bis(trifluoromethylsulphonyl)imide ($[C_6mim][NTf_2]$).

Instead of IL, at least one PIL may be used as the proton donating material of the first component. The at least one poly(ionic liquid) may be cationic based, anionic based, gemini di-ionic based, alternating ionic based and zwitterion based. The at least one PIL may be cationic based and/or anionic based. The at least one poly(ionic liquid) may be selected from the group consisting of poly(alkyl imidazolium), poly(alkyl pyridinium), poly(vinyl sulphonate), poly(acrylamido-2-methylpropane sulphonate), poly(styrene sulphonate), poly(acrylic acid), poly(phosphonic acid), and their derivatives. Non-limiting examples of cationic based PIL may include poly(l-ethyl-3-vinyl-imidazolium) and poly(l-[(2-methacryloyloxy) ethyl]-3-butylimidazolium). Non-limiting examples of anionic based PIL may include poly(4-tetrabutylphosphonium styrene sulphonate) and poly(tributylhexylphosphonium 3-sulphopropylmethacrylate).

Alternatively, at least one deep eutectic salt may be used as the non-aqueous and non-volatile proton donating material of the first component. The at least one deep eutectic salt may comprise a halide or a halogen atom. The term halide, as used in the context of the present disclosure, refers to a compound having a halogen atom. A halogen atom refers to an atom based on an element of group 17 of the chemical periodic table, which includes fluorine, chlorine, bromine, iodine etc. The deep eutectic salt may also comprise ammonium cation, phosphonium cation, sulphonium cation or other cations. For example, the deep eutectic salt may comprise a halide and a Brønsted acid. Non-limiting examples of a halide of deep eutectic salt include choline chloride (ChCl), AgCl, CuCl, LiCl, $CdCl_2$, $CuCl_2$, $SnCl_2$, $ZnCl_2$, $LaCl_3$, $YCl_3$, $SnCl_4$ etc. Non-limiting examples of deep eutectic salts includes ChCl-citric acid, ChCl-oxalic acid, methyltriphenylphosphonium bromide-glycerol, benzyltriphenylphosphonium chloride-2,2,2-trifluoroacetamide, $ZnCl_2$-urea and $ZnCl_2$-hexanediol. The deep eutectic salt may be hydrogen bond donors.

Apart from the first component, the present thermotropic composite material also comprise the second component. The second component may comprise a monomer, oligomer or polymer as the proton accepting material. In some embodiments, the proton accepting material (e.g. monomer, oligomer or polymer) may comprise any value, for example, from 25 weight percent to 75 weight percent, wherein the weight percent is based on the non-aqueous and non-volatile proton donating material, and the proton accepting material. This weight percent range allows the non-volatile thermotropic composite material to maintain their transition temperature/behaviour and mechanical integrity. Advantageously, the concentration of the proton accepting material (in weight percent) based on total amount of the proton donating and proton accepting materials, may be used to adjust the transition temperature of the present thermotropic composite material. Hence, the present thermotropic composite material is versatile in that more than one parameter may be used to tune its transition temperature.

The monomer, oligomer or polymer as a proton accepting material of the second component may comprise or consist of at least one moiety that is capable of forming hydrogen bond with the first component, such as forming hydrogen bond with a cation of the IL. The moiety may include, but is not limited to, one or more oxygen, nitrogen, sulphur or other atoms that can form hydrogen bond. In this regard, the monomer, oligomer or polymer as a proton accepting material of the second component may comprise or consist of at least an ether, a phenyl ester, an amide and an acrylate functional group, according to various embodiments. The weight fraction of such moiety in the monomer, oligomer or polymer used as a proton accepting material of the second component is another parameter that may be used to tune the transition temperature. Generally, the transition temperature tends to be higher with higher weight fraction of such moieties that can form hydrogen bond.

The molecular weight of the monomer, oligmer or polymer used as a proton accepting material of the second component may also be another factor that affects the LCST mechanism. Generally, higher molecular weight tends to lead to lower transition temperature. For example, higher molecular weight of PPO segment may result in lower miscibility in IL, thereby leading to lower transition temperature.

As mentioned above, the polymeric matrix may be used to confine the first and/or second components (including the proton donating and accepting materials), preventing their phase separation from becoming irreversible. When the phase separation is irreversible, the at least one property of the present thermotropic composite material does not revert to its original state after changing. For example, an initially transparent ionogel that turned opaque is not able to revert to its transparent state when the phase separation becomes irreversible.

Another advantage of the polymeric matrix is that it helps to maintain the present thermotropic composite material in its ionogel state. The presence of the polymeric matrix also helps to ameliorate volume reduction or gel shrinkage experienced in conventional thermotropic materials e.g. hydrogel. Having higher volume fraction of the polymeric matrix tends to result in negligible volume change during the change of the at least one property. The polymeric matrix may comprise or consist of a volume fraction of 0.1 to 0.8 of the thermotropic composite material according to various embodiments. Higher volume fraction of the polymer matrix aids in mitigating the bulk volume reduction according to Flory-Huggins theory as a larger polymer fraction can minimize the absolute value of the mixing free energy and diminish the released free energy used for liquid explusion, thereby restraining the extent of unfavourable phase separation.

In various embodiments, the polymeric matrix may be selected from the group consisting of polyester, polyolefin, polyether, ether based polymers, polyurethane, polyacrylate, ionomer, thermoplastic elastomer, polyepoxides and polysiloxanes.

In some embodiments, the present thermotropic composite material may further comprise functional additive(s). The additives may be added to modify the aesthetics of the present thermotropic composite material such that it changes from one colour to another, from a lighter tone to darker tone of the same colour or vice versa. The additive may also be added to impart dual responsivity. For instance, the present thermotropic composite material may react to both thermal energy and light energy received. In some embodiments, the present thermotropic composite material may further comprise or consist of plasmonic transparent conducting oxide, vanadium oxide, thermochromic additive, surface modifier and/or dye dopant. Plasmonic transparent conducting oxide may comprise or consist of metal oxide semiconductor. Non-limiting examples of metal oxide semiconductor may include antimony tin oxide, indium tin oxide, aluminum doped zinc oxide etc. Dye dopant may include methylene blue, methyl orange etc. In other embodiments, further additives such as plasmonic transparent conducting oxide, vanadium oxide, thermochromic additive, surface modifier, dye dopant etc. may not be comprised in the present thermotropic composite material.

As the present thermotropic composite material may be applied in smart window application, the at least one property may comprise or may be the optical state of the present thermotropic composite material. In other words, the present thermotropic composite material may initially be optically pervious (i.e. allow light to pass through to any extent) and becomes optically non-pervious (i.e. does not allow any light to pass through, opaque) or vice versa.

The present disclosure also provides for a method of making a thermotropic composite material as described above. The method may comprise: providing a mixture comprising a first component, a second component and a non-volatile polymeric matrix, wherein the first component comprises a non-aqueous and non-volatile proton donating material, wherein the second component comprises a monomer, an oligomer or a polymer as a proton accepting material; and curing the mixture to form the thermotropic composite material. The thermotropic composite material may be a non-volatile thermotropic composite material.

Embodiments regarding the first component, second component and the non-volatile polymeric matrix as described earlier are applicable to the first component, second component and the non-volatile polymeric matrix of the present method. Advantages associated with various embodiments or features of the present thermotropic composite material as described above may be applicable to embodiments or features of the present method, and vice versa.

In some embodiments of the present method, the providing may comprise mixing the mixture with an organic solvent. This organic solvent may serve as the co-solvent when the first component (e.g. IL) acts as a solvent for the second component and polymeric matrix. As a co-solvent, it enhances processability of the mixture. The organic solvent may comprise acetone, cyclohexanone, butanone or methyl ether ketone. Other organic solvents may be used as long as they provide solubility for both the proton donating material and proton accepting material, and also for a crosslinking agent, if the latter is used.

In some embodiments, the providing may comprise contacting the proton accepting material with a crosslinking agent in the presence of the organic solvent. When the proton accepting material is contacted with a crosslinking agent, the proton accepting material may be crosslinked into forming a part of the non-volatile polymeric matrix. In some instances, the crosslinking agent may comprise an isocyanate. The isocyanate may comprise or consist of an aliphatic isocyanate. The isocyanate may be methylenebis(phenyl isocyanate) (MDI), hexamethylene diisocyanate (HDI), toluene diisocyanate (TDI), or their trimers thereof. The isocyanate can also be an oligomer. A non-limiting example of a HDI isocyanate that can be used is Tolonate™ HDT-90. Other possible crosslinking agents may include ethylene glycol di(meth)acrylate, methylenebisacrylamide, divinylbenzene, and/or their derivatives. The type of crosslinking agent used may depend on the crosslinking chemistry needed. To illustrate these embodiments, a non-limiting example with polypropylene oxide (PPO) as the proton accepting material and Tolonate™ HDT-90 as the isocyanate, is referred to. When PPO is contacted with Tolonate™ HDT-90, the PPO reacts with Tolonate™ HDT-90 and becomes crosslinked to form a part of the non-volatile polymeric matrix. As mentioned above, by crosslinking the proton accepting material to the non-volatile polymeric matrix with the crosslinking agent, the proton accepting material may form a part of the non-volatile polymeric matrix, even though the bulk portion of the proton accepting material may remain as a material distinct from the non-volatile polymeric matrix. Embodiments regarding the molar ratio of the proton accepting material (e.g. PPO) to the crosslinking agent (e.g. isocyanate), which can be used in the present method, have been described above.

In some embodiments, the providing may comprise contacting the mixture with a crosslinking agent in the presence of the organic solvent. The crosslinking agent may comprise an isocyanate, ethylene glycol di(meth)acrylate, methylenebisacrylamide, divinylbenzene, and/or their derivatives.

In various embodiments of the present method, the providing may comprise adding a catalyst to the mixture. The catalyst may comprise dibutylin dilaurate, dibutylin diacetate or zinc octoate. Other suitable catalyst may also be used.

The method may further comprise adding plasmonic transparent conducting oxide, vanadium oxide, thermochromic additive, surface modifier and/or dye dopant to the mixture before curing. These additives may be added to impart additional functionality to the present thermotropic composite material. For instance, adding plasmonic transparent conducting oxide may impart dual responsivity to the present thermotropic composite material such that it reacts to, for example, light and thermal energy received. Examples of plasmonic transparent conducting oxide may include metal oxide semiconductor such as antimony tin oxide, indium tin oxide, aluminum doped zinc oxide etc. In another instance, adding dye dopant(s) may modify the aesthetics of the present thermotropic composite material as described above. The dye dopant may include methylene blue, methyl orange etc.

In the present method, the mixture may be cured to obtain a homogenous ionogel. The curing may be carried out from 30° C. to 50° C. for at most 24 hours. The curing may be carried out with a drying agent in some instances. The drying agent may comprise silica gel, calcium chloride, calcium sulphate, activated charcoal or zeolite molecular sieve. Other dessicants or molecular sieves capable of inducing and/or sustaining a state of dryness may also be used. The silica gel may be in the form of beads. The use of a drying agent at this stage of the present method advantageously ensures no interference of moisture with the formation of the resultant thermotropic composite material.

The present method may further comprise subjecting the non-volatile thermotropic composite material to vacuum after curing, thereby removing the organic solvent. Vacuum drying advantageously accelerates the removal of organic solvents.

While the methods described above are illustrated and described as a series of steps or events, it will be appreciated that any ordering of such steps or events are not to be interpreted in a limiting sense. For example, some steps may occur in different orders and/or concurrently with other steps or events apart from those illustrated and/or described herein. In addition, not all illustrated steps may be required to implement one or more aspects or embodiments described herein. Also, one or more of the steps depicted herein may be carried out in one or more separate acts and/or phases.

EXAMPLES

The present disclosure relates to an improved thermotropic composite material that works on the basis of lower critical solution temperature (LCST) phase separation. The improved thermotropic composite material may be a non-volatile thermotropic composite material.

The present thermotropic composite material may be based on a polymeric matrix and non-volatile component(s). Non-volatile component(s) may include proton accepting material and/or proton donating material. The latter may include, but is not limited to, ionic liquid (IL), poly(ionic liquid) or deep eutectic solvent.

Due to the use of polymeric matrix to confine the non-volatile component(s), the present thermotropic composite material may form a gel. The present thermotropic composite material may be called an iongel or ionogel. The use of at least one non-volatile component (e.g. IL) as the solvent renders the present iongel a better material over existing systems or materials for thermotropic smart window. Requirements such as non-freezing, excellent weatherability, innocuous, free of organic solvents, shrinkage-free etc. are simultaneously fulfilled with the present iongel.

The use of non-volatile component(s) such as IL in a composite material for thermotropic smart window is advantageous because, together with the polymeric matrix, high environmental stability (non-volatile, non-freezing etc.) and tunability (more than one parameter for tuning) can be attained as compared to conventional thermotropic materials that lack such features.

The present thermotropic composite material is further advantageous in that a wide variety of polymer can be used for the polymeric matrix, which allows it to be processed through known polymer processing technologies (e.g. solvent casting or mechanical compounding at appropriate temperature). The present thermotropic composite material can be a crosslinked polymer gel or function as an additive in a resin to impart a thermotropic effect to the end product.

The present thermotropic composite material may also be in the form of a solution, free-standing film, coating, fibers or even exists as an interlayer in films or coatings.

The present thermotropic composite material, its uses and its method of making, are described in the examples below.

Example 1a: Underlying Thermotropic Mechanism and Examples—Driving Force Behind Thermotropic Behaviour In the present non-volatile thermotropic composite material, different forms of reversible optical transitions exist due to the inherent LCST, and possibly upper critical solution temperature (UCST) mechanisms, derived from the added components. The mechanisms of LCST and UCST, and how they have an effect on the resulting optical transition properties of the present thermotropic composite material are discussed as follow.

Due to crystallization of long alkyl side chains at low temperature and melting of these side chains at high temperature, a polymer solution may change from an opaque (immiscible) to transparent (miscible) state. This is an indication of UCST behaviour. In such instances, van der Waals interaction between the long polymer alkyl side chain is an important factor for polymer aggregation.

As for LCST behaviour, when the polymer solution changes from transparent (miscible) to opaque (immiscible), occurrence of structure forming solvation shells and a negative entropy change by mixing is essential. The mixing entropy should be decreased as the mixed molecules become more oriented in solvation because of strong molecular interaction. For example, LCST can be observed between IL and polymer containing moieties of ester and phenyl group, where exothermic solvation may arise from interaction between the anions and the ester group while the cation may form a structurally ordered solvation shell (clathrate phase formation) around the aromatic phenyl group due to cation-π interaction, resulting in a negative entropy of mixing.

Another distinct driving force of LCST behaviour is hydrogen bonding interactions. This is observable, for example, in thermotropic composite materials having an IL and ether based polymers. Experimentally, $^1$H NMR studies showed that protons of the aromatic cation ring (e.g. imidazolium and pyridinium) act as donors and interact with anionic species or proton accepting molecules, such as oxygen atom of ether group, by hydrogen bonding. Such highly directional hydrogen bonds between the acidic cation proton and the ether oxygen atoms also result in negative entropy and enthalpy of mixing. Although LCST behaviour could be observed for different polymer system such as phenyl ester or ether based polymer, the operational mechanism for both polymer systems are different.

Example 1b: Underlying Thermotropic Mechanism and Examples—Factors Affecting Thermotropic Behaviour and their Underlying Mechanisms Different variables, such as polymer concentration, molecular weight, structural modification of polymers (different oxygen weight fractions, copolymerization etc.), ILs blends and structural modifications of ILs (e.g. aromatic versus non-aromatic cations, methylation of cation aromatic main chain, different alkyl chain length of cations and different lewis basicity of anions), and their effect on thermotropic LCST behaviour, provide an understanding of the advantages from the different components of the present thermotropic composite material. Such factors and their underlying mechanism are discussed in this example.

With an increment of polymer concentration in the polymer-IL system, the transition temperature of the mixture tends to decrease till a minimum (referred to as the critical temperature ($T_c$)) at a specific critical compositions ($w_c$), which is then followed by an increase in transition temperature with further increase in polymer concentration (i.e. convex downward profile).

Polymers of different molecular weight may also exhibit LCST behaviour in a polymer-IL system. In general, higher molecular weight leads to lower LCST. This is also observed for aqueous polymer solution with LCST behaviour.

In terms of polymer structural modification, ether based containing moiety is used as the example in this instance, particularly poly(ethylene oxide) where the alkyl backbone is solvatophobic and the ether oxygen atom is solvatophilic. Structural modification was made to achieve different ether based polymers having different oxygen weight fractions such as poly(ethyl glycidyl ether), poly(glycidyl methyl ether) etc. By increasing oxygen weight fractions, more hydrogen bonding interactions can be induced, resulting in higher miscibility.

In binary ILs system, incorporation of another IL of different cation (e.g. in terms of methylation substitution in the aromatic main chain or different alkyl chain length of the cation) could also result in systematic decrement or increment of the transition temperature.

For the case of aromatic versus non-aromatic cations of ILs, it was generally found that polymers tend to be more soluble in IL with aromatic cations. This can be attributed to acidic hydrogen atoms in the aromatic cations, which form hydrogen bonds, for example, with oxygen atoms of ether based polymers. With methylation substitution on the imidazolium cations as an example, the resulting cation losses its hydrogen bonding ability and becomes unable to promote dissolution of the polymer (e.g. hydrogen bonds between ether oxygen atoms), LCST then decreases. The strongest hydrogen bond (most acidic proton) exists at the $2^{nd}$ carbon ($C_2$) of the imidazolium cation, as proven by both experiment and simulation. Interestingly, this phenomenon is found in polyether systems and not in polymers containing both ester and phenyl functional groups.

Regarding increase in imidazolium cation alkyl chain length, the degree of van der Waals interaction with polymer increases as well, leading to a smaller decrease in entropy of mixing, thereby resulting in an increase of LCST.

The classification of ILs anions may be similar to the one for lewis basicity of anions. With an increase in basicity of the anions, stronger interaction occurs between that of the anions and the cations, particularly $C_2$ proton in the case of imidazolium cation. This may affect the hydrogen bonding interaction between polymer and ILs cation, thereby lowering the miscibility (decrease in LCST) between polymer and ILs. It was also found that LCST behaviour is not generally specific to ILs containing imide anions. That is to say, despite certain IL's anions that show immiscibility with polymer, a change in the cation such as increase in alkyl chain length could induce LCST behaviour.

Example 1c: Underlying Thermotropic Mechanism and Examples—Non-Limiting Examples of the Components for Present Thermotropic Composite Material Based on above discussions, there are several different possible scenarios where thermotropic behaviour could be observed. Some of these scenarios are illustrated in FIG. 1.

Component (A) is a form of proton donor. Non-limiting examples of proton donor may include ILs, deep eutectic salts and/or their derivatives. In the case of ILs, non-limiting examples may include aromatic cation based ILs, such as imidazolium and pyridinium based ILs. Other possible cations can be any non-aromatic or aromatic cations such as those containing imidazolium and/or pyridinium moiety with structural modifications (different degree of methylation substitution, difference in alkyl chain length etc.). For thermally responsive transition behaviour to be present, non-limiting examples of IL anion may include acetate, benzenesulphonate, bistriflimide, dicyanamide, dihydrogenphosphate, formate, halides, hexafluorophosphate, hydroxide, lactate, nitrate, tetrachloroferrate, tetrafluoroborate, tricyanomethanide and/or triflate. The proton donor can also comprise binary, ternary, quaternary IL and/or poly(ionic liquid) (PIL), and/or deep eutectic salts of different ions combination, for effective tuning of transition temperature.

Component (B) is a form of proton acceptor. Non-limiting examples of this component include polymer(s) containing ethers, phenyl esters, amides and/or acrylate moieties. These include molecules having different molecular weight (i.e. monomer, oligomers, polymers etc.), copolymers and their derivatives having different structures (e.g. different oxygen weight fraction in ether based derivative polymer, including poly(vinyl butyral), poly(ethyl glycidyl ether), poly(glycidyl methyl ether) and other copolymers), or molecules having different architecture (e.g. branched, crosslinked, various copolymers and their mixtures).

For a guest-host composite material, component (A) itself could exist as guest or host. This applies to component (B), when combined with component (A). Otherwise, another component (C) could be used to host components (A) and/or (B). This component (C) can be an inactive polymeric matrix that is transparent and compatible with both components (FIG. 3C). For example, according to present embodiments disclosed herein, the polymer of the second component, after crosslinking, may serve as the host for enclosing the IL, which becomes the guest. In other instances, the IL may become the host for enclosing the monomer, oligomer or polymer of the second component, which is then the guest. A possible scenario of the latter is illustrated in scenario (3) of FIG. 1.

In order to facilitate processing, long term stability, performance modification and to provide aesthetic functions, component (D) could be further added during/after processing. Non-limiting examples of component (D) include polymer processing aids, plasticizer, anti-oxidants, UV additives, pigments, dyes etc. Furthermore, to impart additional functionalities (e.g. near infra-red shielding) to the present thermotropic composite material, a further component (D) comprising additives or fillers can be included during/after the synthesis process. Modifications to the present thermotropic composite material is further discussed in example 8c.

Typical functional combinations could be (A)+(B) or (A)+(B)+(C). For exceptional cases such as non-polymerizable molecules in combination (1) of FIG. 1, such molecules need to be incorporated into an inactive matrix (C) (e.g. poly(methyl methacrylate), polycarbonate, polyolefins). As for the other combinations (2) to (4) of FIG. 1, incorporation of (A) and (B) into (C) is not mandatory but possible. In addition, (A) and (B) could be incorporated into (C) as individual component or as a single entity through modification, such as modification into a core-shell structure.

Four examples of different scenarios of FIG. 1 are as follow.

(i): 1-ethyl-3-methylimidazolium hexa-fluorophosphate $[C_2mim][PF_6]$+benzyl methyl-ether (ii): 1-butyl-3-methylimidazolium tetra-fluoroborate $[C_4mim][BF_4]$ Poly(propylene glycol)

(iii): Poly(1-ethyl-3-vinylimidazolium bistrofluoromethane sulphonyl) (P[EVIm$^+$][TFSI$^-$])+Butyl Methyl Ether (iv): Poly[2-(1-butylimidazolium-3-yl) ethyl methacrylate acetate] (P6 [BIEMA][Ac])+Poly(benzyl methacrylate)

For combination (2), additives such as crosslinkers (e.g. dimer/trimer) could be added to crosslink polymer containing functional group (e.g. ether, acrylate, amide, or acrylates) into a different polymer (e.g. polyurethane).

Figure 2:
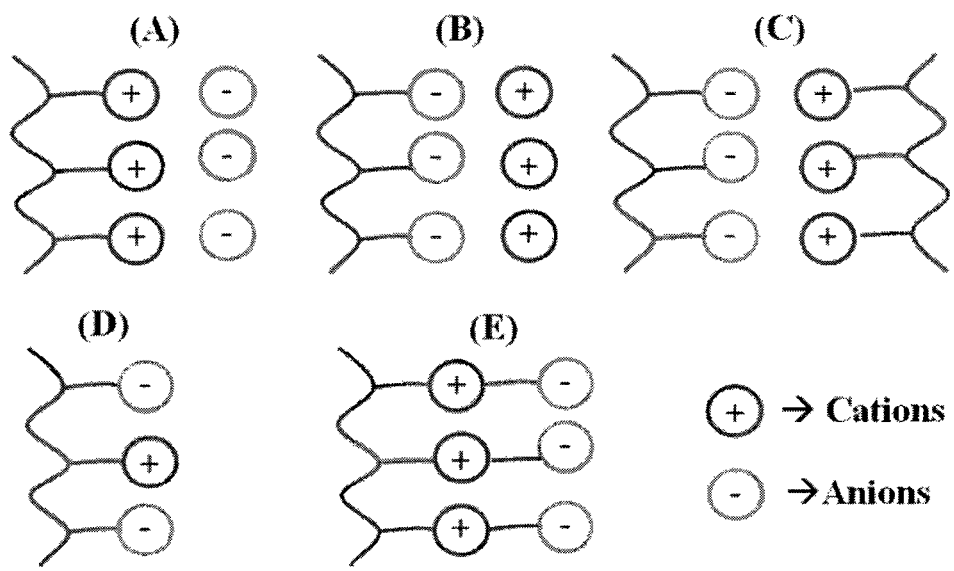
FIG. 2 shows the different classification of poly(ionic liquids) (PILs) where (A) is cationic based, (B) anionic based, (C) both anionic and cationic (gemini di-ionic) based, (D) alternating ionic based and (E) zwitterion based.

As for the case of PILs, some possible classification of PILs are illustrated in FIG. 2. The different classification of PILs includes (A) cationic based, (B) anionic based, (C) both anionic and cationic (gemini di-ionic) based, (D) alternating ionic based and (E) zwitterion based.

Table 1 below shows non-limiting examples of the components used to form the present thermotropic composite material. Table 1 also lists the proton donors and proton acceptors that can be used to create present thermotropic composite material where the at least one property (e.g. optical) can be reversibly changed by cooling the thermotropic composite material. For example, when $[C_4mim][NTf_2]$ and poly(acrylamide) are used, the present thermotropic composite material may change from transparent to opaque by cooling (i.e. thermal energy given out from) the present thermotropic composite material. To revert to its original transparent state, the opaque present thermotropic composite material can be heated.

TABLE 1

Non-limiting Examples of Non-volatile Thermotropic Components

| Examples of Component (A) Based on ILs | Examples of Component (B) Based on Oxygen and/or Nitrogen Containing Polymers |
|---|---|
| Transparent to opaque transition upon heating | |
| [C$_1$mim][BF$_4$] | Poly(ethylene glycol) |
| [C$_4$mim][PF$_6$] | Poly(glycidyl methyl ether) |
| [C$_2$mim][NTf$_2$] | Poly(benzyl methacrylate) |
| [C$_2$mim][NTf$_2$] | Poly(styrene-co-methyl methacrylate) |
| [C$_4$mim][BF$_4$] | Poly(N-vinylcaprolactam) |
| Transparent to opaque transition upon cooling | |
| [C$_4$mim][NTf$_2$] | Poly(acrylamide) |
| [C$_2$mim][NTf$_2$] | Poly(N-isopropylacrylamide) |
| [C$_2$mim][BF$_4$] | Poly(ethylene glycol) |
| [C$_4$mim][PF$_6$] | Poly(octadecyl methacrylate) |
| [C$_4$mim][NTf$_2$] | Poly(octadecyl acrylate) |
| [C$_2$mim][BF$_4$] | Poly(vinylidenefluoride-r-hexafluoropropylene) |

More specifically, for IL-ether based system, the above listed ILs can also be a combination of different aromatic or non-aromatic cations, with anions of different basicity. The cations may include [C$_n$mim] (n is 1 to 10), [C$_6$dmim] (n is 1 to 10), [C$_4$m$_4$im], [C$_4$py], [N$_{1114}$], [Py$_{14}$], [P$_{2225}$] etc. The anions may include [OAc], [OMs], [OTf], [BF$_4$], [PF$_6$], [NTf$_2$], [BETI] etc. The acronyms are listed in table 2 below.

For IL-phenyl ester based system, the above listed ILs can also be a combination of different cations such as [C$_n$mim] (n=1 to 10), [C$_n$dmim] (n=1 to 10), [bmpro] etc. with different anions such as [TFSI] etc.

TABLE 2

List of Acronyms for Cations and Anions of the Present Thermotropic Composite Material

| Cations | | Anions | |
|---|---|---|---|
| [C$_n$mim] | 1-alkyl-3-methylimidazolium | [OAc] | acetate |
| [C$_n$dmim] | 1-alkyl-2,3-dimethylimidazolium | [OMs] | mesylates |
| [C$_4$m$_4$im] | 1-butyl-2,3,4,5-tetramethylimidazolium | [OTf] | tri-fluoromethanesulphonate |
| [C$_4$py] | butyl-pyridinium | [BF$_4$] | tetra-fluoroborate |
| [N$_{1114}$] | tri-methylethyl amide | [PF$_6$] | hexa-fluorophosphate |
| [Py$_{14}$] | 1-N-butyl-1-methylpyrrolidinium | [NTf$_2$] | bis(tri-fluoromethane sulphonyl)amide |
| [P$_{2225}$] | tri-ethyl-pentyl-phosphonium | [BETI] | bis(perfluoroethylsulphonyl)imide |
| [bmpro] | N-butyl-N-methylpyrrolidinium | [TFSI] | tri-fluoromethane sulphonyl |

The working principle behind the present thermotropic composite material's thermally responsive transition is based on a subtle balance between the interaction of the proton donor and proton acceptor. For example, a slight change in the structure of each component may deteriorate or enhance such transition. However, all these parameters can be readily tuned by techniques such as chemical modification, composition change and/or copolymerization with blending, bearing in mind that these components are non-volatile.

Figure 3A:
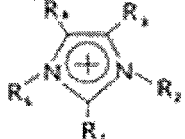
FIG. 3A shows a list of examples of a non-volatile key component, specifically proton donor (A) which includes, but is not limited to, ionic liquids (ILs) and PILs, both having cation and anion.
Figure 5:
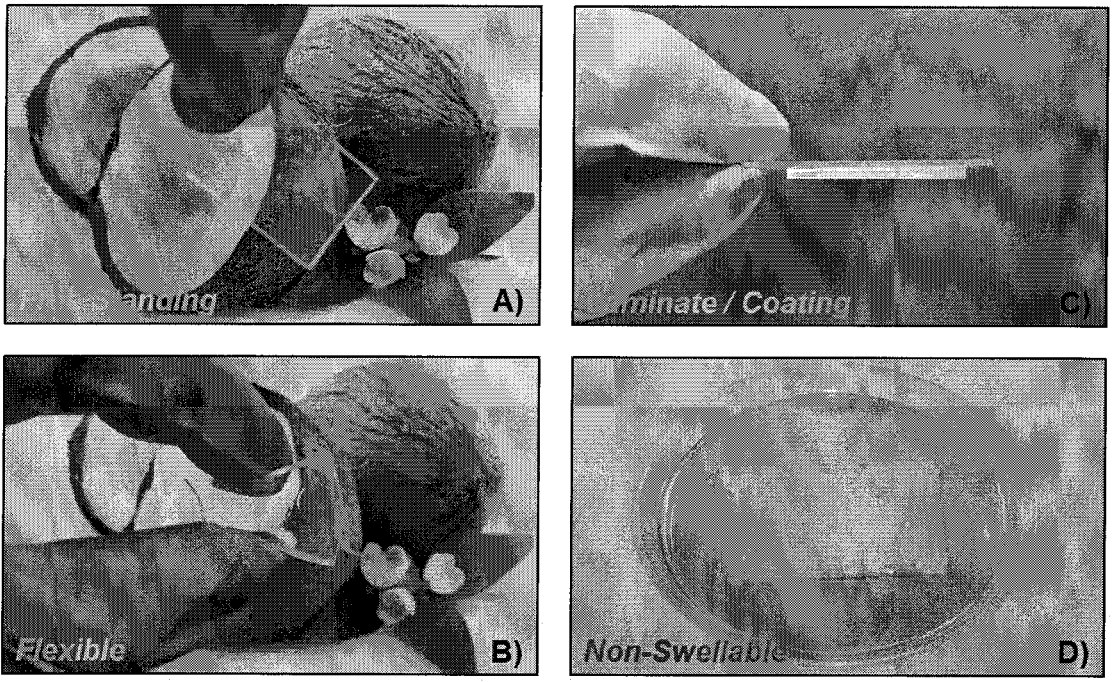
FIG. 5A demonstrates the robustness of a thermotropic polymer, in the form of a free-standing film. The thermotropic polymer film shown is 2 mm thick.
FIG. 5B shows the same film of FIG. 5A and demonstrates the flexibility of the film.
FIG. 5C demonstrates the robustness of the thermotropic polymer according to embodiments disclosed herein, which enables its applicability as an external laminate/coating.
FIG. 5D shows the same laminate/coating of FIG. 5C and demonstrated water resistant property by immersing the hydrophobic thermotropic polymer laminate/coating into 100 ppm aqueous methyl orange (MO) for 24 hours. No weight change was observed upon immersion while phase changing behaviour was maintained.
Figure 6:
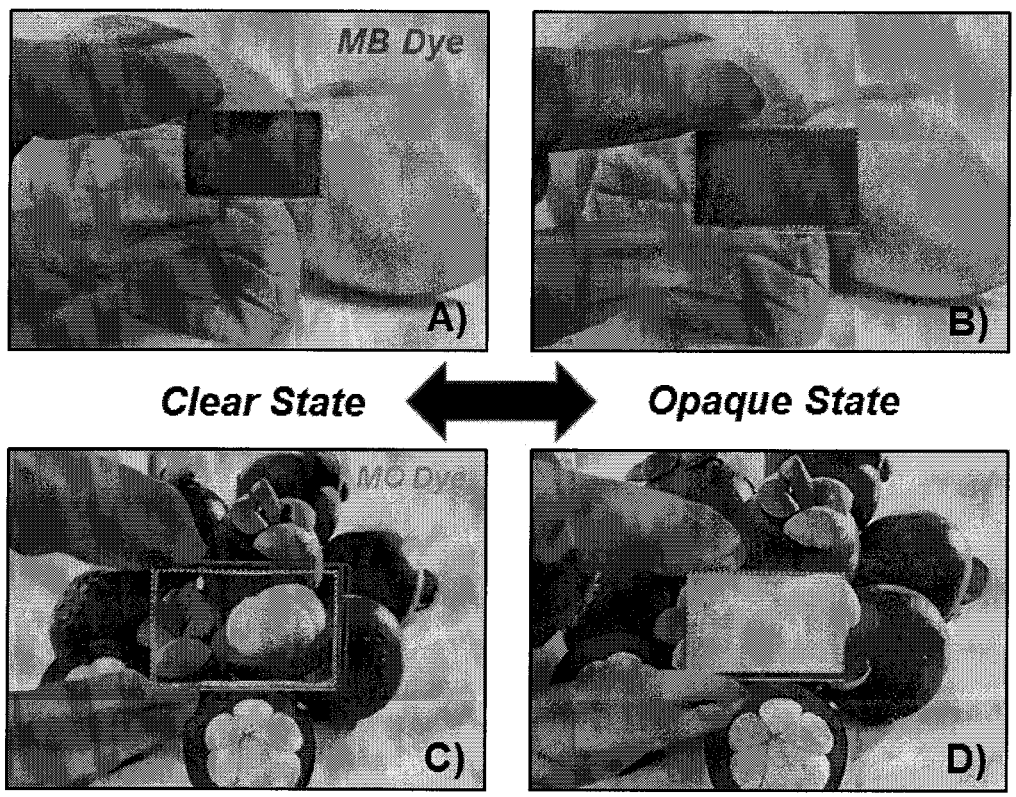
FIG. 6A illustrates methylene blue (MB) (which appears green due to the yellow background from the fruit) doped film in the clear state. The PU thermotropic film can be derived from 50 wt % PPO and 50 wt % [$C_4$mim][$NTf_2$]. The PU thermotropic film in this instance is specifically derived from 5.84 wt % isocyanate, 45.45 wt % PPO, 45.45 wt % [$C_4$mim][$NTf_2$] and 3.26 wt % dibutylin dilaurate catalyst. The isocyanate acts as the crosslinker to have the PPO form a part of the PU.
FIG. 6B illustrates the dye doped film of FIG. 6A in the opaque state after placement of film on a heating stage at 60° C. for 3 minutes.
FIG. 6C illustrates MO dye doped film in the clear state. The PU thermotropic film can be derived from 50 wt % PPO and 50 wt % [$C_4$mim][$NTf_2$]. The PU thermotropic film in this instance is specifically derived from 5.84 wt % isocyanate, 45.45 wt % PPO, 45.45 wt % [$C_4$mim][$NTf_2$] and 3.26 wt % dibutylin dilaurate catalyst. The isocyanate acts as the crosslinker to have the PPO form a part of the PU.
FIG. 6D illustrates the dye doped film of FIG. 6C in the opaque state after placement of film on a heating stage at 60° C. for 3 minutes.

Example 1d: Underlying Thermotropic Mechanism and Examples—Examples of Non-Volatile Key Components FIG. 3A illustrates a list of materials for proton donors (A), such as IL having different cations, anions and its derivatives. Another possibility of such materials would be deep eutectic salts or solvents with different combinations of halide salts and/or hydrogen bond donors. Non-limiting examples of proton acceptor (B) shown in FIG. 3B include, monomers, oligomers and polymers containing ethers, phenyl esters, amides and/or acrylates functional groups. Several different classes of matrix polymer for polymeric matrix (C) are also listed in FIG. 3C. The examples as described, and as illustrated in FIG. 3A to FIG. 3C, could function as both non-volatile additives and matrices in the present thermotropic composite material.

Example 2: Comparison Between Conventional and Present Thermotropic Composite Material The present thermotropic composite materials comprise switching from an optically pervious state (e.g. transparent/translucent) to a non-optically pervious state (opaque) or vice versa, especially in the context of applications such as smart window or transparent heat shield where autonomous light modulation (transparent to opaque) is desired. Considering this capability, a semi-quantitative comparison of electrically driven reverse mode polymer dispersed liquid crystal system (RM-PDLC), autonomous switching materials based on phase separation (hydrogels) and phase transition (TSFD), and the present thermotropic material, is therefore shown in table 3.

TABLE 3

Performance Properties of Thermotropic Hydrogels, Polymers Blends and Systems Based on TSFD Compared to Present Thermotropic Composite Material

| Properties | RM-PDLC | Hydrogels | TSFD | Current Invention |
|---|---|---|---|---|
| Products | In research Phase | Affinity Intelligent Window ™ | Solardim ®-Eco | Ready to be commercialized |
| Switching temperature | N.A. | 5-60° C. | 25-100° C. | Subzero to 150° C. |
| Max solar transmittance (clear state) | <80% | 82% | 70% | >85% |
| Switching range | Low | High | Low | High |

TABLE 3-continued

Performance Properties of Thermotropic Hydrogels, Polymers Blends and Systems Based on TSFD Compared to Present Thermotropic Composite Material

| Properties | RM-PDLC | Hydrogels | TSFD | Current Invention |
|---|---|---|---|---|
| Reversibility | Yes | High | High | High |
| Reproducibility | High | High | High | High |
| Homogeneous stability | High | High | High | High |
| Hysteresis | Low | Low | Low | Low |
| Haze in clear state | High | Low | High | Low |
| Turbidity (opaque state) | Uniform | Uniform | Uniform | Uniform |
| Switching process | Steep | Steep | Steep | Steep |
| Other consideration | High driving voltage, delamination, thermal and/or chemical instability | UV protection required and susceptible to desiccation | Susceptible to delamination | UV protection required |
| Ecological aspects | Innocuous | Innocuous | Innocuous | Innocuous |
| Material costs | Expensive liquid crystals | Expensive if synthetic materials used | Low | Medium |

N.A. - data not available

Although RM-PDLC systems have been intensively studied in the past, their operations are often demonstrated by using electric means such as voltage induced crystals reorientation or joule heating. Hence, RM-PDLC systems are still considered an active system rather than an autonomous one. Furthermore, limitations such as low optical switching range, poor mechanical properties, high driving voltage, delamination, thermal and chemical instability have been reported for RM-PDLC systems.

Studies on thermotropic materials are often conducted with different measuring geometry and wavelength of incident light. Monochromatic light at an arbitrarily chosen wavelength or integrated data over visible or complete range of solar radiation weighted by specific relative spectral distribution have been reported. As a result of the different methods used in quantification analysis, a quantitative comparison is often not possible. Nevertheless, the comparison of performance properties in the manner as listed in table 3 has been used.

Example 3: Reversibility and Stability of the Present Thermotropic Composite Material FIG. 4A to FIG. 4D demonstrate the irreversible biphasic separation of IL-PPO solution mixture (PPO: polypropylene oxide) after subjecting to water bath for 12 hours at 60° C. No crosslinking agent is present in the IL-PPO solution mixture. Meanwhile, FIG. 4E to FIG. 4H demonstrate the optical transition reversibility of IL-PU thermotropic device (PU: polyurethane) after placement on a heating stage for 12 hours at 60° C. Comparison of reversibility studies for both solution mixture (FIG. 4A to FIG. 4D) and device (FIG. 4E to FIG. 4H) were conducted with 50:50 PPO to [C$_4$mim][NTf$_2$] ratio. Irreversible biphasic separation may occur when the present thermotropic composite material is heated above its LCST and the polymer is not crosslinked to form a part of the polymeric matrix.

Example 4a: Various Forms of the Present Thermotropic Composite Material

As shown in FIG. 4A to FIG. 4H and FIG. 5A to FIG. 5D, the present non-volatile thermotropic composite material can exist in the form of a solution mixture (e.g. see FIG. 4A), an interlayer (e.g. see FIG. 4E), free-standing film (e.g. see FIG. 5A) and laminate/coating (e.g. see FIG. 5C) due to its superior mechanical properties as compared to those of conventional hydrogels. Furthermore, with the versatile combination of components as illustrated in (FIG. 1) and additional modification of components (e.g. core-shell structure), the present non-volatile thermotropic composite material can also exist in other forms, such as solution, gel, fiber etc., to be suitable for applications in both rigid and/or flexible devices. The expression "solution mixture", in the context of this example, specifically refers to the IL-PPO system alone. FIG. 4A to 4D show the solution mixture.

Figure 10:
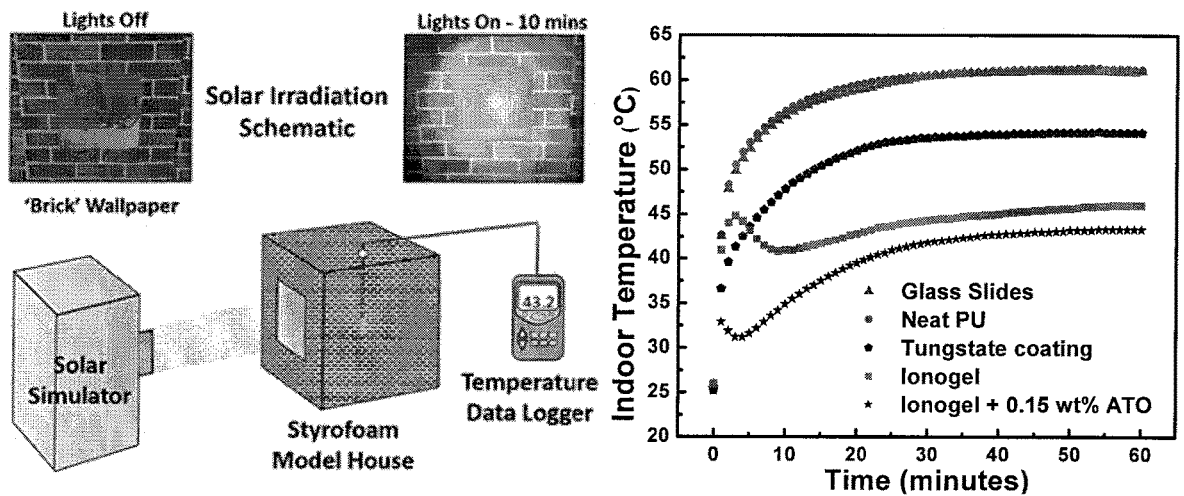
FIG. 10 shows a schematic illustration of the experimental setup for monitoring indoor temperature of model house equipped with windows made of various materials (see left image). The photographs show the model house (front view) equipped with smart window of 0.15 wt % antimony tin oxide (ATO) composite material before and after solar irradiation, respectively. The "NTU logo" in the mini model house was used for visual checking of window transparency. The inner dimensions of the model house was 0.22 m×0.22 m×0.19 m, and wall thickness was 0.03 m. The energy distribution for the solar source is 5%, 45% and 50% in UV, visible and NIR range, respectively. The right image of FIG. 10 depicts the temperature profiles of an indoor sensor behind windows under solar irradiation. The transition temperature of the ionogel used for the model house is 33° C., and the ionogel has a composition of 6.0 wt % NCO, 47.0 wt % PPO, 15.1 wt % [$C_4$dmim][$NTf_2$] and 31.9 wt % [$C_4$mim][$NTf_2$]. In this instance, the ionogel is specifically derived from, including the catalyst, 5.84 wt % isocyanate, 45.45 wt % PPO, 14.54 wt % [$C_4$dmim][$NTf_2$], 30.91 wt % [$C_4$mim][$NTf_2$] and 3.26 wt % dibutylin dilaurate catalyst.

Example 4b: Various Forms of the Present Thermotropic Composite Material—Miniature Smart Window Sandwich Structure In order to quantitatively evaluate the present thermotropic composite material's (ionogel's) performance for autonomous solar energy blocking in real situation, a heat-insulating styrofoam model house was constructed and an artificial sunlight source for testing out the smart window was used instead of infrared (IR) lamp or halogen lamp. An IL-PU system was used. This mimics the real application better. As shown in FIG. 10, thermotropic ionogels and non-smart materials demonstrate different temperature profiles under irradiation. For non-smart windows, the indoor temperature rapidly and monotonously increases before reaching a plateau while the indoor temperature would decrease before slowly increasing to saturation for smart ionogels. This is because the optical switching of ionogel makes the indoor sensor's energy collection rate suddenly lower than the rate of energy dissipation to air. After that, indoor temperature increases much slower due to the slashed energy input. Although tungstate based coating for near infrared (NIR) shielding may help achieve an indoor temperature reduction of about 7° C. compared with normal float glass, this widely used non-smart material is not able to modulate the energy carried by visible light, which accounts for roughly half of sunlight energy. On the other hand, the present ionogel achieved a 17° C. temperature reduction due to the ability to modulate in both NIR and visible range. The synergistic effect of antimony tin oxide (ATO) and the ionogel helps the composite to achieve the largest temperature reduction of about 20° C. compared to float glass. Therefore, the present ionogel has been demonstrated to adapt dynamically to outdoor environment and achieve better indoor cooling compared to conventional materials. This also demonstrates the advantageous energy savings derivable from the present ionogel.

Example 5: Aesthetic Modifications

Due to the nature of the present thermotropic composite material applicability, aesthetic modifications are often necessary. FIG. 6A to FIG. 6D illustrate an example of dye doping by immersing transparent film in 100 ppm of aqueous methylene blue and methyl orange for 12 hours. An IL-PU system was used. The specific compositions of the thermotropic composite film of FIG. 6A to FIG. 6D have been described above. The PU comprises PPO crosslinked to form a part of the PU. FIG. 6A to FIG. 6D demonstrate versatility of the present thermotropic composite material compared to conventional reflective coatings/films that tend to be dark or blue coloured. Advantageously, the present thermotropic composite material can be easily dyed to different colours due to good affinity between the ILs and the organic dyes without compromising its thermotropic properties.

Example 6a: Tunability of the Present Thermotropic Composite Material

For the present non-volatile thermotropic composite material, many parameters could be manipulated to achieve the desired transition temperature. For example, the tunability of the present thermotropic additives (A+B) was demonstrated through adjustment of polymer to solvent ratio, as well as binary solvent composition as shown in FIG. 7A.

Figure 7A:
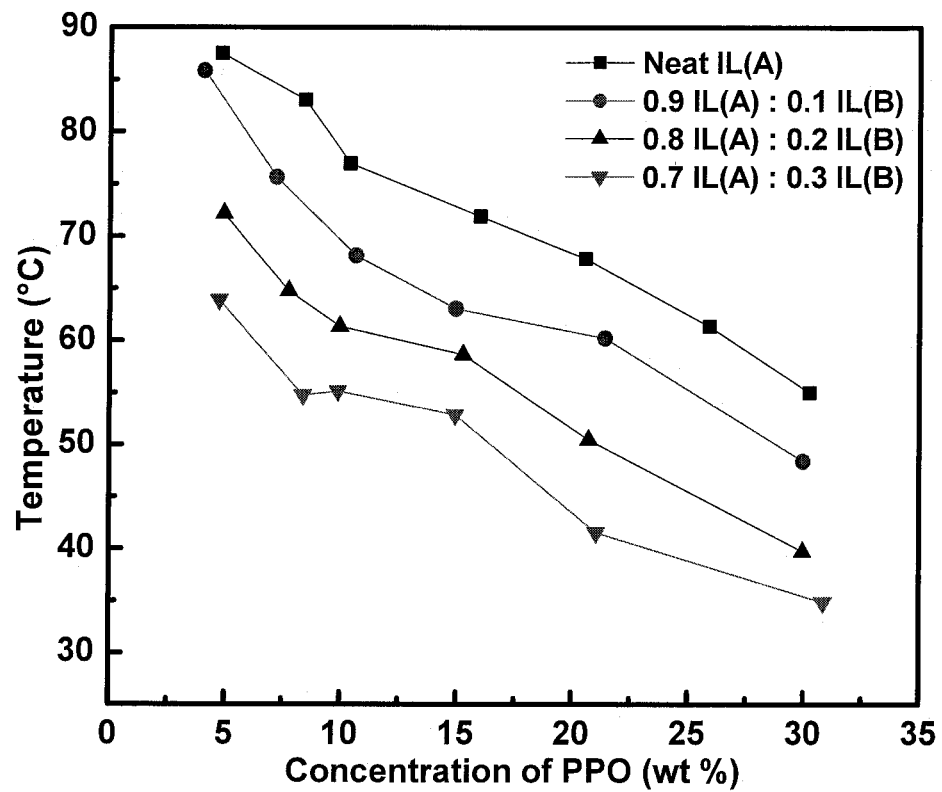
FIG. 7A shows a plot of the transition temperatures of a thermotropic material against concentration of PPO (wt %).

FIG. 7A demonstrates that the thermotropic additive transition temperature could be tuned by adjusting polymer to IL ratio as well as binary IL ratio. Specifically, IL(A) refers to $[C_4mim][NTf_2]$ while IL(B) refers to $[C_4dmim][NTf_2]$. Transition temperature was determined by differential scanning calorimetry (DSC) during the first heating cycle with a ramp rate of 5° C./min.

It is worthwhile to note that the transition temperature detected from DSC does not fully reflect on the optical transition temperature obtained by naked eye or through spectroscopy detection. However, the trend observed in FIG. 7A serves as an effective guide for the tuning of transition temperature of the thermotropic device.

Furthermore, for a thermotropic composite material that is immiscible at room temperature (e.g. those having a LCST below 25° C.), solvatophilic or solvatophobic components could be incorporated to tune the transition temperature. For example, with the increment of PPO in $[C_4mim][NTf_2]$ from 10 to 40 wt %, the LCST of the mixture decreased from about 66° C. to 42° C. Further increase in PPO content to 50 wt % resulted in a heterogeneous mixture at room temperature. FIG. 8A to FIG. 8D show an example of immiscible mixture consisting of 90 wt % PPO in IL. With the addition of PVB-Butanol as a solvatophilic additive (PVB: polyvinyl butyral), the resultant mixture changes into a homogenous composite material at room temperature, exhibiting a LCST of 45° C. in a hot water bath observable by the naked eye.

Example 6b: Transition Temperature Tunability Based on Mechanistic Study of IL-Polymer Interactions by Molecular Dynamic Simulation (MDS)

This example specifically demonstrates the on-demand tuning of transition temperature tunability in an ionogel of the present disclosure (i.e. present thermotropic composite material) based on mechanistic study of IL-polymer interactions by Molecular Dynamic Simulation (MDS). The transition temperature range can be tuned from below 0° C. (e.g. −50° C.) to even above 100° C. depending on the components used to form the present thermotropic composite material. This is advantageous over conventional hydrogels which are unable to have their transition temperature tuned below subzero temperatures or above 100° C.

Figure 7B:
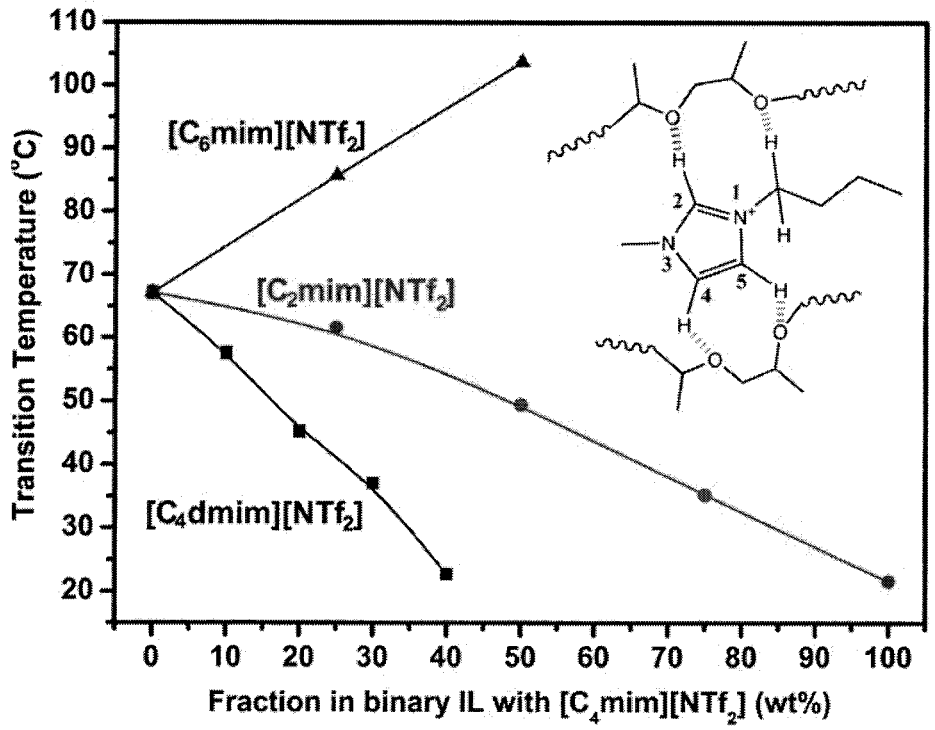
FIG. 7B illustrates the influence of varying the fraction of one IL in a binary ILs on the present thermotropic composite material's optical transition temperature. Optical transition temperature is defined as the temperature with a transmittance drop of 20% from the highest value at 550 nm. The inset (chemical structure) shows the possible hydrogen bonds between the cation and PU network. The most probable hydrogen bond is between the hydrogen on the $2^{nd}$ carbon ($C_2$) of the imidazolium cation and PPO. Anions have been omitted from illustration in the inset for clarity.
Figure 8:
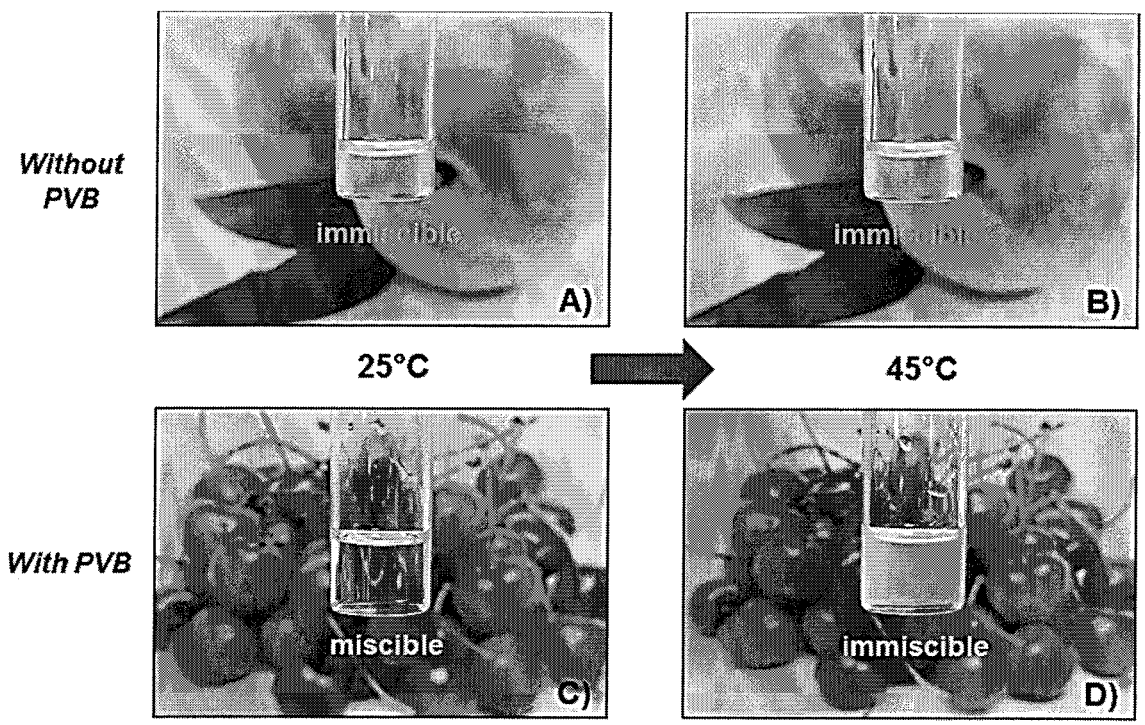
FIG. 8A is used to illustrate the tunability of LCST for 90 wt % PPO and 10 wt % [$C_4$mim][$NTf_2$] without incorporating 6 wt % of PVB-Butanol solution (PVB: polyvinyl butyral). Specifically.
FIG. 8B is used to illustrate the tunability of LCST for 90 wt % PPO and 10 wt % [$C_4$mim][$NTf_2$] without incorporating 6 wt % of PVB-Butanol solution. Specifically.
FIG. 8C is used to illustrate the tunability of LCST for 90 wt % PPO and 10 wt % [$C_4$mim][$NTf_2$] incorporating 0.5 wt % of the 6 wt % of PVB-Butanol solution. Specifically.
FIG. 8D is used to illustrate the tunability of LCST for 90 wt % PPO and 10 wt % [$C_4$mim][$NTf_2$] incorporating 0.5 wt % of the 6 wt % of PVB-Butanol solution. Specifically.

Optical transition temperature for ionogel containing neat $[C_4mim][NTf_2]$ is about 68° C., which is considerably high for smart window applications. Modifying the network composition by copolymerization is possible but tedious for tuning transition temperature. Alternatively, the on-demand tuning of transition temperature can be realized easily and precisely by introducing a second IL into the ionogel to form a binary IL system with $[C_4mim][NTf_2]$. For instance, transition temperature can be shifted within a wide range between 20° C. and over 100° C. by doping $[C_2mim][NTf_2]$ or $[C_6mim][NTf_2]$ (FIG. 7B). $[C_4dmim][NTf_2]$, which has the $C_2$ proton in cation, when replaced by methyl group, is able to reduce transition temperature even to subzero degrees (when ≥50% in binary IL). It is known that LCST-type phase separation happens only when both $\Delta S_{mix}$ and $\Delta H_{mix}$ are negative, and hydrogen bond is often a predominant factor. In the present ionogel, hydrogen bonds between PPO and IL result in an exothermic mixing process, and the molecular orientation required by hydrogen bonds contributes to a negative $\Delta S_{mix}$ (see inset of FIG. 7B). The reduced hydrogen bond capacity in $[C_4dmim][NTf_2]$ may explain for its immiscibility with PPO at lower temperature, and hence, its ability to lower transition temperature.

Example 7a: Mechanical Properties

Figure 11A:
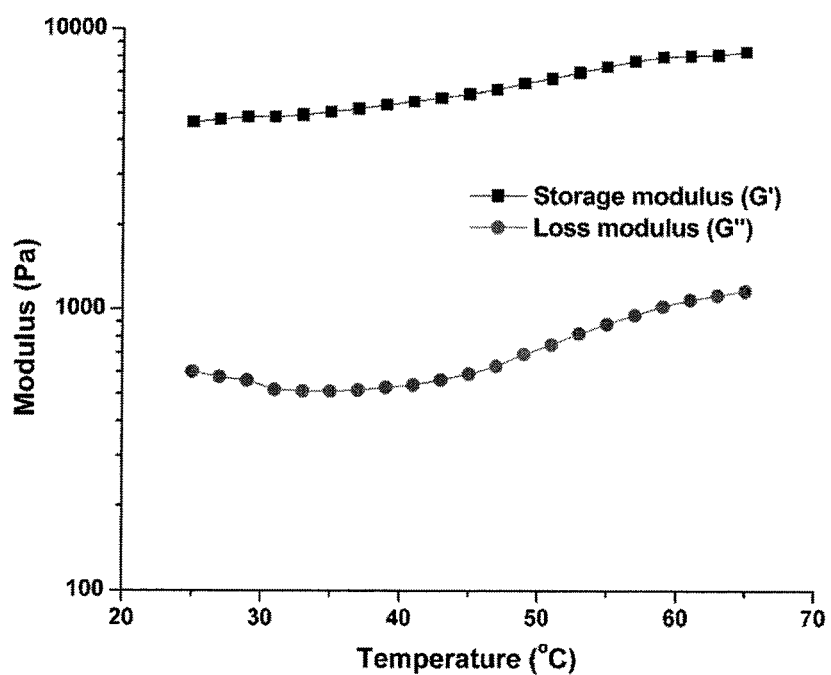
FIG. 11A shows the storage and loss modulus of the present ionogel at various temperatures. The present ionogel has a transition temperature around 31° C. The test was conducted by a rheometer from TA Instruments with an isothermal chamber. The strain was 1% and frequency is 1 Hz with a set gap of 1700 micrometers.
Figure 11B:
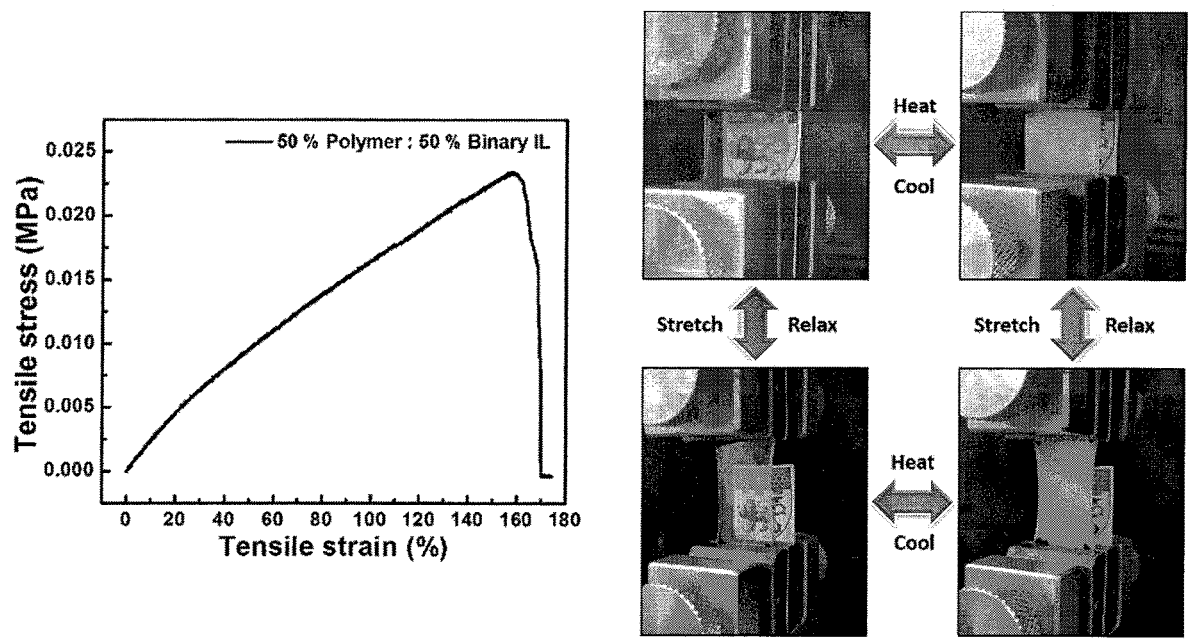
FIG. 11B demonstrates the mechanical robustness of the present ionogel with binary IL of 30 wt % [$C_4$dmim][$NTf_2$] and 70 wt % [$C_4$mim][$NTf_2$]. The left image depicts a plot of the stress strain properties of the ionogel tested at 10 mm $min^{-1}$ while the right image illustrates reversibility of optical switch could be observed after 50 cycles of sequential heating, stretching, cooling and relaxing.

Detailed mechanical properties of the present ionogel (PU based) are illustrated through FIG. 11A and FIG. 11B.

Dynamic mechanical data between 25° C. and 65° C. in FIG. 11A demonstrated that the present ionogels were indeed in the gel state with G'>G". G' values remained largely unchanged within the temperature range exhibiting a typical rubber plateau like behavior of an elastomeric material. No distinct change of G' was detected below and above the LCST (FIG. 11A). Interestingly, the ionogel's thermotropic properties were retained during stretching (FIG. 11B). Such mechanical robustness would be desirable for applications that require such an advantageous mechanical property.

Example 7b: Super-Cyclic Stability

Figure 12A:
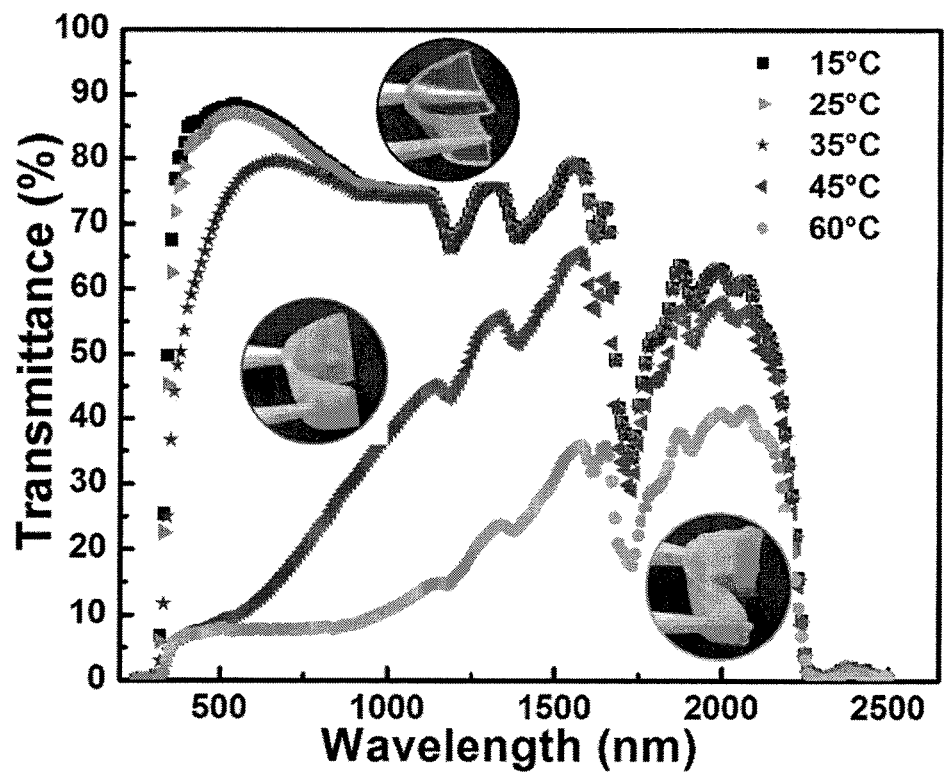
FIG. 12A shows the transmittance spectra of the present ionogel containing 33% [$C_4$dmim][$NTf_2$] and 67% [$C_4$mim][$NTf_2$] as the binary ILs, at various temperatures. The transition temperature ($T_t$) is about 33° C. and insets show the transparent (top inset), translucent (middle inset) and opaque (bottom inset) states of the flexible ionogel.
Figure 12B:
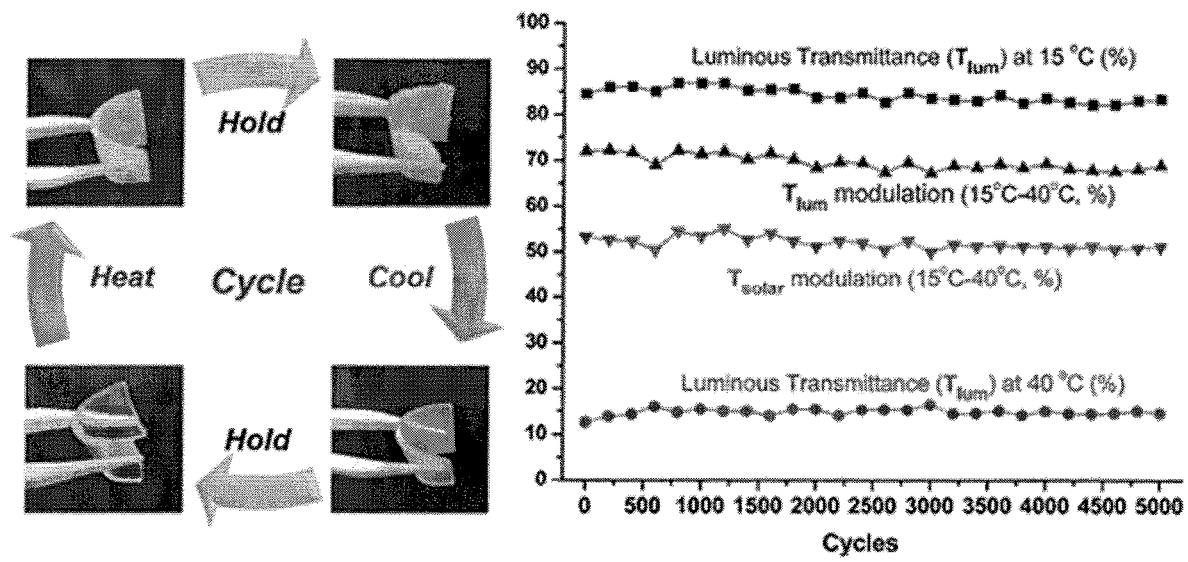
FIG. 12B shows the optical performance reversibility of ionogel during 5000 cycles. One cycle between transparent and opaque states contains heating, holding, cooling and holding steps (see left image). The ionogel for ageing test contains 35% [$C_4$dmim][$NTf_2$] and 65% [$C_4$mim][$NTf_2$] for the binary ILs and the transition temperature was about 31° C. Luminous ($T_{lum}$) and solar ($T_{solar}$) transmittance refer to the integral value from 380 nm to 780 nm and 250 nm to 2500 nm, respectively (see right image). The modulation was obtained from the difference of transmittance values at 15° C. and 40° C.

In addition, the present ionogel's thermotropic properties are highly repeatable. As shown in FIG. 12B, the ionogel's optical parameters including luminous transmittance ($T_{lum}$), luminous transmittance modulation ($\Delta T_{lum}$) and solar transmittance modulation ($\Delta T_{sol}$) varied within 5% after 5000 heating-cooling cycles. The heating-cooling cycle is a kinetic process and holding of temperatures may be used between heating and cooling to ensure each stage is completed before commencing next stage e.g. heating is completed before cooling starts. Based on the results, the present thermotropic composite material demonstrated phase-separation mechanism with impressive performance reversibility. The ageing test may be further continued even though it has been demonstrated, through the 5000 cycles, that the present ionogel's light modulation ability is reliable and stable in an actual field application for an extended period of time. In this example, the ionogel is PU based.

Example 8a: Experimental—Non-Limiting Examples of Materials Used

Hexamethylene diisocyanate trimer (HDI homopolymer), trade name Tolonate™ HDT-90 was purchased from Vencorex chemicals. Poly(propylene glycol), also known as polypropylene oxide (PPO), with a number-average molar mass (Mn) of 4000, dibutylin dilaurate (DBTDL) 95% and 1-Butyl-3-methylimidazolium bis(trifluoromethylsulphonyl) imide, $[C_4mim][NTf_2]$≥98% was purchased from Sigma Aldrich. 1-Butyl-2,3-dimethylimidazolium bis(trifluoromethylsulphonyl)imide, $[C_4dmim][NTf_2]$≥98% was purchased from Merck. Methyl ethyl ketone (MEK) (HPLC) grade with 0.08% of water, purchased from Tedia® was used as received.

Example 8b: Non-Limiting Example of Fabrication of the Present Thermotropic Composite Material Firstly, 0.18 g of Tolonate™ HDT-90 (example of an isocyanate) was mixed with 1.40 g of PPO and 0.77 g of MEK was used as a co-solvent in order to solubilize the pre-gel mixture. NCO:PPO ratio was set to be 1.2:1 (NCO represents —N=C=O of an isocyanate). The pre-gel solution was left to homogenize by stirring for 5 minutes. Binary IL mixture, consisting of 1.33 g of [$C_4$mim][$NTf_2$] and 0.07 g of [$C_4$dmim][$NTf_2$] were then added to the pre-gel solution and stirred for another 10 minutes, followed by addition of 8 drops of 10 wt % DBTDL catalyst. The resultant pre-gel solution was then poured into a casting mould with polytetrafluoroethylene (PTFE) plate as substrate and steel spacer in order to control the resultant film thickness. The casting mould was then placed inside an air tight container laid with silica gel beads and left to cure in an appropriate environment and condition (e.g. 40° C. for 4 hours). The cured sample may be subjected to vacuum to remove the MEK.

Example 8c: Modification of the Present Thermotropic Composite Material

Apart from the inclusion of processing or performance enhancement aids such as particles and stabilizers, functional additives (i.e. component D) may also be added to make the present thermotropic composite material multi-responsive (photo-, electro-, magneto-, bio-responsive etc.). Functional additives include those that enhance switching characteristic of the present thermotropic composite material. Non-limiting examples may include (a) plasmonic transparent conductive oxide (e.g. antimony tin oxide, indium tin oxide, aluminum doped zinc oxide) as a thermal driver, (b) using $VO_2$ phase transition properties to enhance solar modulation performance, (c) using thermochromic additives (e.g. photonic crystals, plasmonic nanoparticles, leuco-dye-developer and/or cholesteric liquid crystals) to impart thermochromic properties, and (d) using additives/coating to modify the surface chemistry of the present non-volatile thermotropic composite material (photocatalytic self-cleaning, hydrophobic/hydrophilic coatings etc.). An example illustrating the incorporation of antimony tin oxide is shown in example 8d below.

Figure 9:
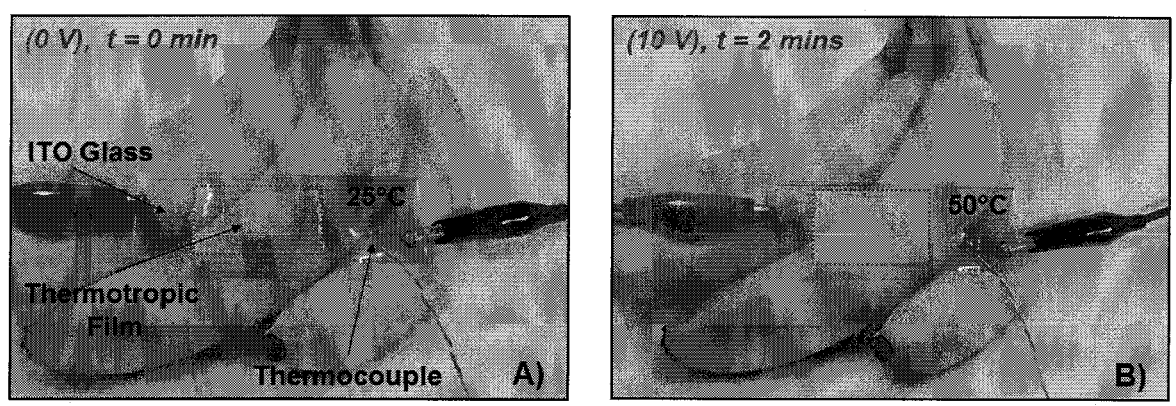
FIG. 9A illustrates the joule-heating setup, where the joule-heating is exemplified as a method for triggering the optical transition of a thermotropic PU film (which can be derived from 40 wt % PPO-60 wt % Binary IL consisting of 20 wt % [$C_4$dmim][$Ntf_2$] and 80 wt % [$C_4$mim][$NTf_2$]) with a transition temperature of 42° C. A transition time of 2 minutes was observed for an applied voltage of 10 V. The PU thermotropic film in this instance is specifically derived from 5.84 wt % HDT-90 (a hexamethylene diisocyanate trimer), 10.91 wt % [$C_4$dmim][$NTf_2$], 43.63 wt % [$C_4$mim][$NTf_2$], 36.36 wt % PPO and 3.26 wt % dibutylin dilaurate catalyst. The isocyanate acts as the crosslinker to have the PPO form a part of the PU.
FIG. 9B illustrates the thermotropic PU film of FIG. 9A turned opaque after a transition time of 2 minutes under an applied voltage of 10 V in joule-heating.

Furthermore, utilization of different heating methods for triggering optical transition is also possible. Non-limiting examples of different heating methods include heating by electrical means (e.g. joule-heating) or photo heating. An example of joule heating is illustrated in FIG. 9A (left image) and FIG. 9B (right image).

Figure 13A:
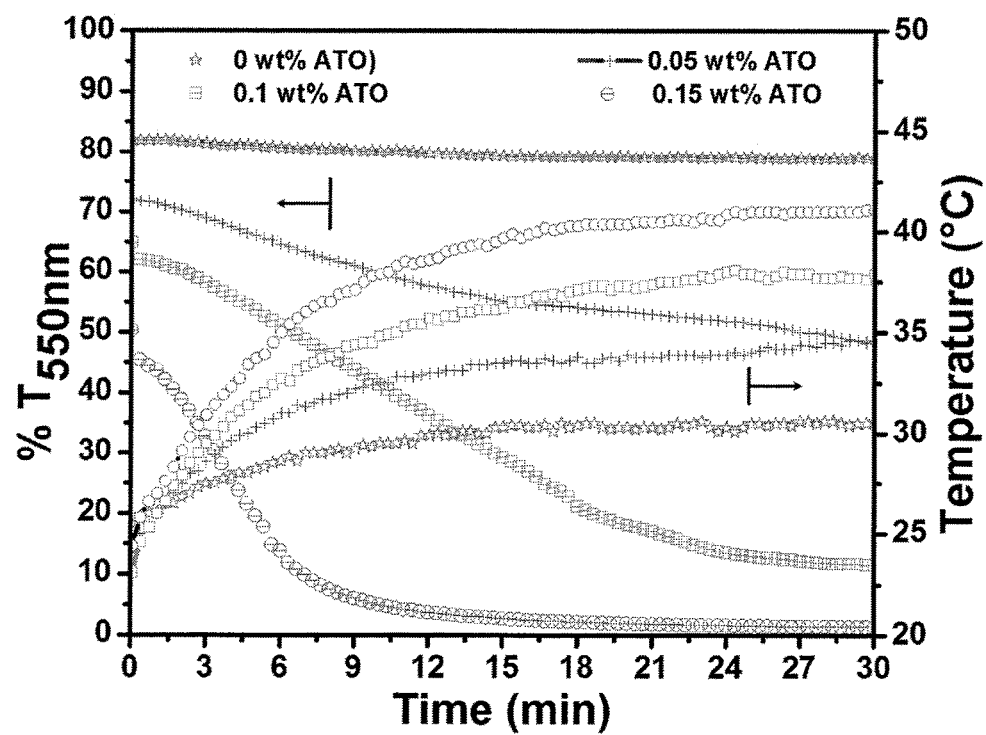
FIG. 13A shows the profiles of surface temperatures and normal-normal transmittances at 550 nm for ionogels with different contents of ATO nanoparticles under solar irradiation.
Figure 13B:
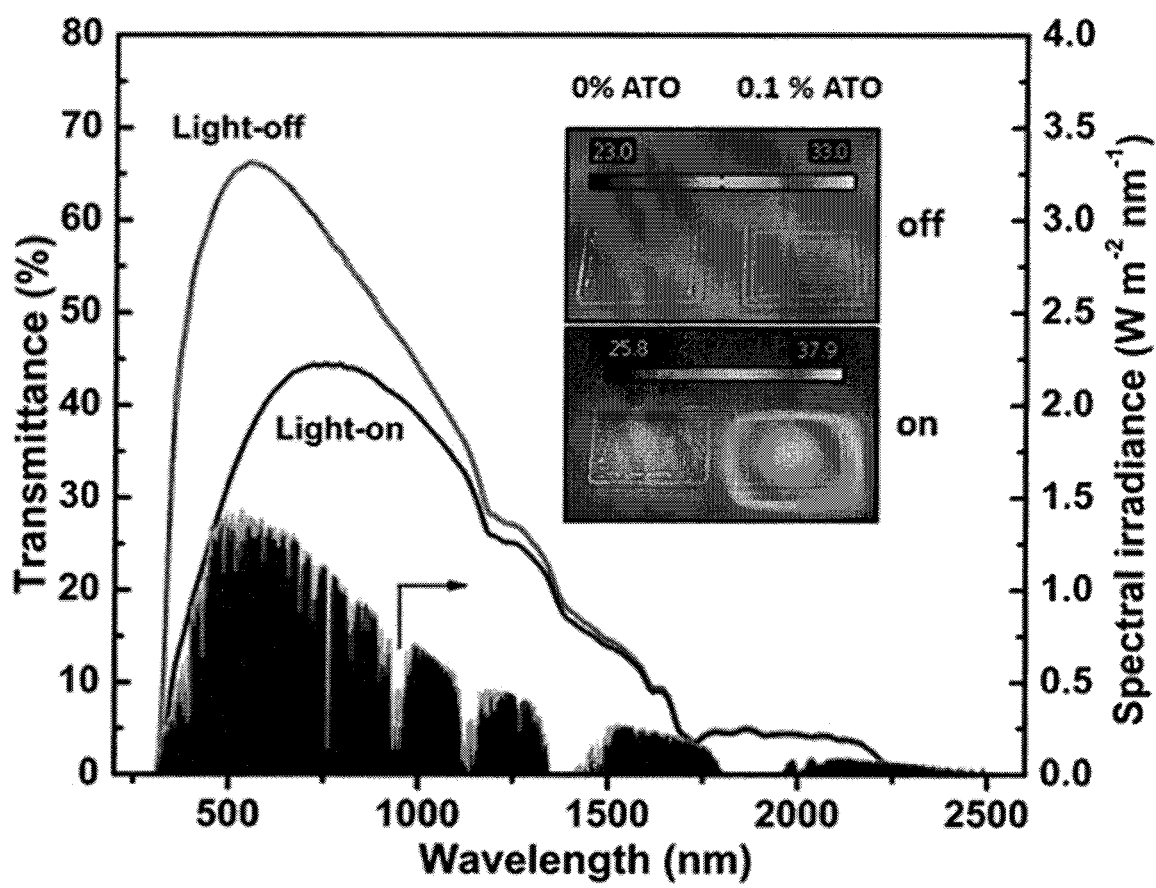
FIG. 13B shows the transmittance of ionogel with 0.1 wt % ATO before and after 1 sun solar irradiation mapping with the solar irradiance spectrum.

Example 8d: Ease of Nanoparticles Incorporation to Impart Multi-Functionality Further, ATO nanoparticles were incorporated into the present ionogel to impart dual responsivity, which enable an ionogel smart window to adjust its transparency in accordance with a complex outdoor climate, especially in the case of low temperature but high solar luminance intensity. The surface temperature increment of neat ionogel under sun irradiation was demonstrated to be insufficient to trigger the optical transition (see FIG. 13A). Temperature of the present ionogel, however, rose by 15° C. within 30 minutes to realize autonomous anti-glaring properties (see FIG. 13B) owing to ATO's plasmonic resonance heating. When solar irradiation was turned off, the composite ATO-ionogel continued to preserve a high luminous transmittance for the smart window. In fact, ATO perfectly matches with the present ionogel in that neat ionogel modulates more remarkably in visible range while ATO predominantly absorbs NIR light. Therefore, the presence of ATO in ionogel not only facilitates and accelerates the dimming control but also shields the NIR irradiation to alleviate indoor air-conditioning burden.

Example 9: Estimated Cost of the Present Thermotropic Composite Material

The approximate cost for an example of the present thermotropic film (50 wt % PPO and 50 wt % [$C_4$mim][$NTf_2$]) is illustrated. The estimated raw material cost for individual components as shown in table 4 below may be retrieved from any available suppliers. The figures obtained for table 4 are obtained from one of the available suppliers. Based on the components' costs, the estimated cost for a thermotropic film (87.5 cm×62.5 cm×0.2 cm) of the present disclosure may amount to USD $22.58.

TABLE 4

Estimated Cost Breakdown for a Thermotropic Film Dimension of 87.5 cm × 62.5 cm × 0.2 cm Prototype.

| Material | Cost USD ($) | Min. Order | Required Amount (g) | Cost USD ($) |
|---|---|---|---|---|
| Poly(propylene glycol)-4000 | 1/kg | 1000 Kg | 35 | 0.04 |
| 1-butyl-3-methylimidazolium bromide | 1/kg | 25 Kg | 12.5 | 0.01 |
| Lithium bis(trifluoromethane sulphonyl(imide | 1/g | 100 g | 22.5 | 22.5 |
| Hexamethylene diisocyanate (HDI) | 1.9/kg | 10 Barrels | 4.5 | 0.01 |
| Methyl Ether Ketone (MEK) | 1/kg | 100 Kg | 20 | 0.02 |

Example 10: Applications and Utility

The thermotropic composite material of the present disclosure may be used for various applications which include, but is not limited to, smart windows (e.g. light dimming function, energy saving, enhancing privacy, safety glass), transparent heat shield (e.g. as a thermotropic layer in flat-plate collector to prevent overheating of devices such as solar panel), agriculture (including horticulture), display boards (e.g. advertisements), equipments used in the entertainment industry, toys, games, apparels, fashion gadgets and accessories. Thus, the present thermotropic composite material is suitable for a wide range of applications.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A non-volatile thermotropic composite material comprising:
   a first component comprising a non-aqueous and non-volatile proton donating material;
   a second component comprising a monomer, an oligomer, or a polymer, as a proton accepting material;
   a non-volatile polymeric matrix; and
   wherein the non-volatile polymeric matrix, the first component and the second component are configured to maintain at least one property which is reversibly changeable based on thermal energy received by or given out from the non-volatile thermotropic composite material.

2. The non-volatile thermotropic composite material according to claim 1, wherein the non-aqueous and non-volatile proton donating material comprises any value from 30 weight percent to 70 weight percent of the non-volatile thermotropic composite material.

3. The non-volatile thermotropic composite material according to claim 1, wherein the non-aqueous and non-volatile proton donating material comprises at least one ionic liquid, at least one poly(ionic liquid), or at least one deep eutectic salt.

4. The non-volatile thermotropic composite material according to claim 3, wherein the at least one ionic liquid has a cation selected from the group consisting of ammonium, cholinium, imidazolium, isoquinolinium, oxazolium, phosphonium, piperidinium, pyrazinium, pyridinium, pyrimidinium, pyrrolidinium and sulphonium.

5. The non-volatile thermotropic composite material according to claim 3, wherein the at least one ionic liquid has an anion selected from the group consisting of acetate, benzenesulphonate, bistriflimide, dicyanamide, dihydrogenphosphate, formate, halides, hexafluorophosphate, hydroxide, lactate, nitrate, tetrachloroferrate, tetrafluoroborate, tricyanomethanide and triflate.

6. The non-volatile thermotropic composite material according to claim 3, wherein the at least one poly(ionic liquid) is cationic based, anionic based, gemini di-ionic based, alternating ionic based, and/or zwitterion based.

7. The non-volatile thermotropic composite material according to claim 6, wherein the at least one poly(ionic liquid) is selected from the group consisting of poly(alkyl imidazolium), poly(alkyl pyridinium), poly(vinyl sulphonate), poly(acrylamido-2-methylpropane sulphonate), poly(styrene sulphonate), poly(acrylic acid), poly(phosphonic acid), and derivatives thereof.

8. The non-volatile thermotropic composite material according to claim 3, wherein the at least one deep eutectic salt comprises a halide or a halogen atom.

9. The non-volatile thermotropic composite material according to claim 1, wherein the proton accepting material comprises any value from 25 weight percent to 75 weight percent, wherein the weight percent is based on the non-aqueous and non-volatile proton donating material, and the proton accepting material.

10. The non-volatile thermotropic composite material according to claim 1, wherein the proton accepting material comprises an ether, a phenyl ester, an amide, and/or an acrylate functional group.

11. The non-volatile thermotropic composite material according to claim 1, wherein the proton accepting material is crosslinked by a crosslinking agent to form a part of the non-volatile polymeric matrix.

12. The non-volatile thermotropic composite material according to claim 1, wherein the polymeric matrix comprises a volume fraction of 0.1 to 0.8 of the non-volatile thermotropic composite material.

13. The non-volatile thermotropic composite material according to claim 1, further comprising a plasmonic transparent conducting oxide, a vanadium oxide, a thermochromic additive, a surface modifier, and/or a dye dopant.

14. The non-volatile thermotropic composite material according to claim 1, wherein the at least one property comprises an optical state of the non-volatile thermotropic composite material.

15. A method of making a non-volatile thermotropic composite material, wherein the non-volatile thermotropic composite material comprises:
    a first component comprising a non-aqueous and non-volatile proton donating material;
    a second component comprising a monomer, an oligomer, or a polymer, as a proton accepting material;
    a non-volatile polymeric matrix; and
    wherein the non-volatile polymeric matrix, the first component and the second component are configured to maintain at least one property which is reversibly changeable based on thermal energy received by or given out from the non-volatile thermotropic composite material,
    wherein the method comprises:
        providing a mixture comprising the first component, the second component, and the non-volatile polymeric matrix; and
    curing the mixture to form the non-volatile thermotropic composite material.

16. The method according to claim 15, wherein the providing comprises mixing the mixture with an organic solvent.

17. The method according to claim 16, wherein the providing comprises contacting the proton accepting material with a crosslinking agent in the presence of the organic solvent.

18. The method according to claim 15, wherein the providing comprises adding a catalyst to the mixture.

19. The method according to claim 15, further comprising adding a plasmonic transparent conducting oxide, a vanadium oxide, a thermochromic additive, a surface modifier, and/or a dye dopant, to the mixture before curing.

20. The method according to claim 15, wherein the curing is carried out with a drying agent.

* * * * *